US008833697B2

(12) United States Patent
Seack et al.

(10) Patent No.: US 8,833,697 B2
(45) Date of Patent: Sep. 16, 2014

(54) COMPONENT, REINFORCEMENT MEMBER, STRUCTURAL ARRANGEMENT, AIRCRAFT OR SPACECRAFT AND METHOD

(71) Applicants: Oliver Seack, Bremen (DE); Alexander Bruns, Bremen (DE)

(72) Inventors: Oliver Seack, Bremen (DE); Alexander Bruns, Bremen (DE)

(73) Assignee: Airbus Operations GmbH, Hamburg (DE)

( * ) Notice: Subject to any disclaimer, the term of this patent is extended or adjusted under 35 U.S.C. 154(b) by 83 days.

(21) Appl. No.: 13/649,203

(22) Filed: Oct. 11, 2012

(65) Prior Publication Data
US 2013/0094898 A1 Apr. 18, 2013

Related U.S. Application Data

(60) Provisional application No. 61/546,754, filed on Oct. 13, 2011.

(30) Foreign Application Priority Data

Oct. 13, 2011 (DE) .......................... 10 2011 084 433

(51) Int. Cl.
| B64C 5/10 | (2006.01) |
| B29C 70/20 | (2006.01) |
| D03D 13/00 | (2006.01) |
| B64C 1/00 | (2006.01) |
| B29C 70/22 | (2006.01) |
| B29C 70/86 | (2006.01) |

(52) U.S. Cl.
CPC .............. B64C 1/00 (2013.01); *Y02T 50/433* (2013.01); B29C 70/205 (2013.01); D03D 13/00 (2013.01); B29C 70/222 (2013.01); *Y02T 50/43* (2013.01); B29C 70/86 (2013.01)
USPC ........................... 244/99.2; 248/113; 248/222

(58) Field of Classification Search
USPC ................ 244/99.2, 131, 132, 133, 129.1; 403/121, 291
See application file for complete search history.

(56) References Cited

U.S. PATENT DOCUMENTS 661,346 A * 11/1900 Lincoln .......................... 16/277
1,843,170 A * 2/1932 Meldrim ........................ 16/227
(Continued)

FOREIGN PATENT DOCUMENTS

DE 2757965 6/1979
DE 3546267 8/1986
(Continued)

OTHER PUBLICATIONS

German Office Action for Serial No. 10 2001 084 433.3 dated Jun. 26, 2012.
(Continued)

*Primary Examiner* — Christopher P Ellis
*Assistant Examiner* — Medhat Badawi
(74) *Attorney, Agent, or Firm* — Jenkins, Wilson, Taylor & Hunt, P.A.

(57) ABSTRACT

A component for connecting structures to intersection regions of said component is disclosed, particularly for an aircraft or spacecraft, including a coupling element, including a first fiber which wraps around the coupling element so that the first fiber extends in a first plane in front of the coupling element and in a second plane behind the coupling element, the first and second planes intersecting, and including a second fiber which wraps around the coupling element so that the second fiber extends in a third plane in front of the coupling element and in a fourth plane behind the coupling element, the third and fourth planes intersecting, and with the first fiber portions of the first and second fibers crossing over in a first region and the second fiber portions of the first and second fibers crossing over in a second region.

15 Claims, 19 Drawing Sheets

(56) References Cited

U.S. PATENT DOCUMENTS

| | | | |
|---|---|---|---|
| 3,818,951 A * | 6/1974 | Greenwood | 139/20 |
| RE28,672 E * | 1/1976 | Wakeman | 16/227 |
| 4,201,815 A * | 5/1980 | Weiland et al. | 428/113 |
| 4,382,712 A * | 5/1983 | Buchs et al. | 403/376 |
| 4,395,450 A * | 7/1983 | Whitener | 428/116 |
| 4,584,226 A | 4/1986 | Vitale et al. | |
| 4,671,470 A * | 6/1987 | Jonas | 244/119 |
| 4,686,134 A * | 8/1987 | Ono | 428/222 |
| 4,715,560 A * | 12/1987 | Loyek | 244/117 R |
| 4,725,485 A * | 2/1988 | Hirokawa | 442/187 |
| 5,463,794 A * | 11/1995 | Erland | 16/225 |
| 5,945,053 A * | 8/1999 | Hettinga | 264/171.13 |
| 6,481,911 B1 * | 11/2002 | Streuber | 403/5 |
| 7,198,691 B2 * | 4/2007 | Ludin et al. | 156/293 |
| 7,425,103 B2 * | 9/2008 | Perez-Sanchez | 403/121 |
| 7,451,950 B2 * | 11/2008 | Perez-Sanchez | 244/219 |
| 7,521,108 B2 | 4/2009 | Franklin et al. | |
| 7,541,083 B2 * | 6/2009 | Grose et al. | 428/119 |
| 7,582,345 B2 * | 9/2009 | Priegelmeir et al. | 428/60 |
| 7,900,878 B2 * | 3/2011 | Perez-Sanchez | 244/219 |
| 8,220,744 B2 | 7/2012 | Benthien | |
| 8,322,656 B2 * | 12/2012 | Pahl | 244/120 |
| 8,328,134 B2 * | 12/2012 | Wagner | 244/99.2 |
| 8,642,151 B2 | 2/2014 | Goering et al. | |
| 2005/0175399 A1 * | 8/2005 | Perez-Sanchez | 403/256 |
| 2005/0175406 A1 * | 8/2005 | Perez-Sanchez | 403/373 |
| 2008/0173761 A1 * | 7/2008 | Benthien | 244/131 |
| 2009/0149100 A1 | 6/2009 | Goering | |
| 2010/0148008 A1 * | 6/2010 | Hernando et al. | 244/131 |
| 2011/0143085 A1 * | 6/2011 | Blot et al. | 428/102 |
| 2013/0091675 A1 | 4/2013 | Seack | |
| 2013/0092794 A1 | 4/2013 | Seack | |
| 2013/0099062 A1 | 4/2013 | Seack | |

FOREIGN PATENT DOCUMENTS

| | | |
|---|---|---|
| DE | 102006035576 | 12/2007 |
| DE | 102009043103 | 3/2011 |
| DE | 102007011613 | 7/2011 |
| EP | 1 145 841 | 10/2001 |
| EP | 1627726 | 2/2006 |
| FR | 2 412 782 | 7/1979 |
| WO | WO 2011/035860 | 3/2011 |

OTHER PUBLICATIONS

German Office Action for Serial No. 10 2011 084 441.4 dated May 24, 2012.

German Office Action for Serial No. 10 2011 084 472.4 dated Jun. 26, 2012.

German Office Action for Serial No. 10 2011 084 438.4 dated May 23, 2012.

Extended European Search Report for Application No. 12188065.2 dated Apr. 25, 2013.

Non-Final Office Action for U.S. Appl. No. 13/649,218 dated Apr. 17, 2014.

* cited by examiner (I - I)

(II - II)

(III)

COMPONENT, REINFORCEMENT MEMBER, STRUCTURAL ARRANGEMENT, AIRCRAFT OR SPACECRAFT AND METHOD

CROSS-REFERENCE TO RELATED APPLICATIONS

This application claims the benefit of and priority to U.S. Provisional Application No. 61/546,754, filed on Oct. 13, 2011, and German patent application No. 10 2011 084 433.3, filed Oct. 13, 2011, the entire disclosures of which are incorporated herein by reference.

FIELD OF THE INVENTION

The present invention relates to a component, a reinforcement member, a structural arrangement, an aircraft or spacecraft and a method for producing a component.

BACKGROUND OF THE INVENTION

FIG. 1 shows a detail of an aircraft which is generally denoted by reference numeral 100. The aircraft 100 comprises a landing flap 102. FIG. 1 shows the landing flap 102 when viewed in the direction opposite to the flight direction of the aircraft 100. The landing flap 102 is shown once by a dashed line, this view corresponding to the unloaded state of the landing flap. The landing flap 102 is also shown by way of a solid line, this corresponding to the deformed state of the landing flap owing to air loads 104, which is shown in a much exaggerated manner. The landing flap 102 is connected by means of two flap carriages 106, 108 to a wing 110, which is indicated merely schematically. The flap carriages 106, 108 make it possible to adjust the landing flap 102 in relation to the wing 110 from a flight position into a take-off or landing position, the take-off and landing position serving to increase the lift. In the span direction, that is to say from left to right in FIG. 1, one flap carriage 106 is designed as a fixed bearing and the other flap carriage 108 is designed as a loose bearing. The flap carriages 106, 108 are each connected to the landing flap 102 via an eye-bolt connection 112.

It is known to design the eye of a respective eye-bolt connection 112 as a fitting which is made of metal and connected, in particular riveted, to the landing flap 102. For example, DE 10 2007 011 613 A1 shows a metal fitting for load introduction.

There is an increasing need even to produce load introduction elements, for example the above-described eye of the eye-bolt connection 112, from fibre composite materials, for example carbon-fibre-reinforced plastics material (CFRP), in order to reduce further weight and assembly costs. U.S. 2010/0148008 A1 describes a load introduction element of this type made of fibre composite material.

SUMMARY OF THE INVENTION

An idea of the invention is to provide an improved, fibre-compatible approach to introducing loads, in particular into box-like structures, for example landing flaps.

Accordingly, a component for connecting structures to intersection regions of said component, in particular for an aircraft or spacecraft, is provided, comprising a coupling element, comprising a first fibre which wraps around the coupling element in such a way that the first fibre extends, with a first fibre portion, in a first plane in front of the coupling element and, with a second fibre portion, in a second plane behind the coupling element, the first and second planes intersecting, and comprising a second fibre which wraps around the coupling element in such a way that the second fibre extends, with a first fibre portion, in a third plane in front of the coupling element and, with a second fibre portion, in a fourth plane behind the coupling element, the third and fourth planes intersecting, the first fibre portions of the first and second fibres crossing over in a first region and the second fibre portions of the first and second fibres crossing over in a second region.

Furthermore, a reinforcement member for connecting structures to intersection regions of said member, in particular for an aircraft or spacecraft, is provided, comprising an embedding part and the component according to the invention which is embedded into the embedding part.

Yet further, a structural arrangement, in particular for an aircraft or spacecraft, is provided, comprising a first structure, comprising a second structure which forms an intersection region together with the first structure, and comprising the component according to the invention, which interconnects the first and second structures in the intersection region, or comprising the reinforcement member according to the invention, which interconnects the first and second structures in the intersection region.

Yet further, an aircraft or spacecraft comprising the structural arrangement according to the invention is provided.

Yet further, a method for producing a component, in particular the component according to the invention, is provided having the following steps: placing a first fibre around a first coupling element in such a way that the first fibre extends, with a first fibre portion, in a first plane in front of the coupling element and, with a second fibre portion, in a second plane behind the coupling element, the first and second planes intersecting, placing a second fibre around a second coupling element in such a way that the second fibre extends, with a first fibre portion, in a third plane in front of the coupling element and, with a second fibre portion, in a fourth plane behind the coupling element, the third and fourth planes intersecting, removing the first and second coupling elements, superposing the first fibre with the second fibre in such a way that the first fibre portions of the first and second fibres intersect in a first region and the second fibre portions of the first and second fibres intersect in a second region and therefore form a closed passage for a third coupling element, and inserting the third coupling element through the closed passage.

The idea on which the present invention is based consists in that two fibres are coupled in the component by means of a coupling element in such a way that the fibres can transfer loads between at least two different planes which are arranged obliquely, in particular perpendicularly, to one another. In this way, a fitting made of fibre composite material, which is connected to a landing flap by means of a coupling element of this type, can be prevented from peeling off, for example.

The use of the component is not limited to the aviation or aerospace industry. For example, this can also be used in lightweight construction or in bridges, high-rise buildings, pylons, roofs or other load-bearing structures.

In the present case, a "closed passage" should be understood to mean a passage which, viewed in a direction perpendicular to a plane in which the first or second fibre wraps around the coupling element, is completely delimited by the first and second fibres.

Advantageous configurations of the invention are provided in the dependent claims.

A multitude of first and second fibres may of course be provided.

According to one configuration of the component according to the invention, it is provided that the first and second planes are arranged substantially perpendicular to one another and/or the third and fourth planes are arranged substantially perpendicular to one another. In this way, the component is well suited to reinforcing structures which intersect at an angle of approximately 90 degrees.

According to one configuration of the component according to the invention, it is provided that the coupling element comprises one or more fibres which are in particular interwoven, the one or more fibres preferably extending in a direction perpendicular to a plane in which the first or second fibre wraps around the coupling element. In this way, a lightweight and at the same time stable coupling element can be provided.

According to one configuration of the component according to the invention, it is provided that the one or more fibres comprise glass or carbon and/or are provided with a thermoplastic and/or thermosetting matrix. The thermoplastic and/or thermosetting matrix is preferably cured before the first and second fibres are placed around the coupling element thus formed.

According to one configuration of the component according to the invention, it is provided that the coupling element is formed, preferably in the shape of a rod, from a monolithic material, in particular aluminium or titanium. In this way, the coupling element can be produced in a simple manner. It is also conceivable for the coupling element to be formed from a mixture of fibres and metal.

According to one configuration of the component according to the invention, it is provided that the coupling element has a rounded, in particular circular, cross-section in a plane in which the first or second fibre wraps around the coupling element. In this way, the coupling element can be produced in a simple manner, in particular extruded.

According to one configuration of the component according to the invention, it is provided that a multitude of first fibres which form a plurality of first fibre strands and a multitude or second fibres are provided which form a plurality of second fibre strands which are arranged so as to alternate with the first fibre strands in a direction perpendicular to a plane in which the first or second fibre wraps around the coupling element. In this way, the component can be produced in a simple manner because entire fibre strands can be more efficiently processed, in particular placed around a respective coupling element, than individual fibres.

According to one configuration of the component according to the invention, it is provided that the first fibre strands are interwoven with third fibre strands and the second fibre strands are interwoven with fourth fibre strands, for example, fifth fibre strands further being interwoven with the third fibre strands and forming a first closed passage together with the first fibre strands and/or sixth fibre strands being interwoven with the fourth fibre strands and forming a second closed passage together with the second fibre strands, the coupling element extending through the first and second passages. A particularly stable construction is achieved by interweaving the fibres.

According to one configuration of the structural arrangement according to the invention, it is provided that the first structure is formed as a box structure, in particular as a box structure of an aerofoil or control surface or a control flap, the first fibre portion of the first fibre of the component being connected to a first wall portion of the box structure and/or the second fibre portion of the second fibre being connected to a second wall portion of the box structure, the second structure preferably being configured as an internal web inside and an external web outside the box structure, the first fibre portion of the second fibre of the component being connected to the internal web and/or the second fibre portion of the first fibre of the component being connected to the external web, the external web preferably comprising an eye for attaching an adjusting member, in particular a flap carriage, a lever and/or a coupling rod. It is therefore possible in a simple manner to use the component for connecting structures.

According to one configuration of the structural arrangement according to the invention, it is provided that an adjusting member arranged on an aerofoil or control surface engages in the eye of the structural arrangement, the adjusting member preferably being configured as a flap carriage which is displaceably arranged on the aerofoil or control surface and is in engagement with the eye. A connection capable of being loaded is therefore produced, for example of a landing flap on an aerofoil.

According to one configuration of the method according to the invention, it is provided that a first woven fabric having a multitude of first fibres and a second woven fabric having a multitude of second fibres are provided, the first coupling element being pushed into a compartment instead of the weft thread when weaving the first woven fabric and the second coupling element being pushed into a compartment when weaving the second woven fabric. The first and second fibres form corresponding warp threads of the first and second woven fabrics respectively. The third and fourth fibres form corresponding weft threads of the first and second woven fabrics respectively. In this way, a simple production process is achieved.

BRIEF DESCRIPTION OF THE DRAWINGS

The invention is explained in greater detail in the following by way of embodiments, with reference to the appended figures of the drawings, in which.

In the figures, like reference numerals denote like or functionally like components, unless indicated otherwise.

DETAILED DESCRIPTION OF THE INVENTION

Figure 2A:
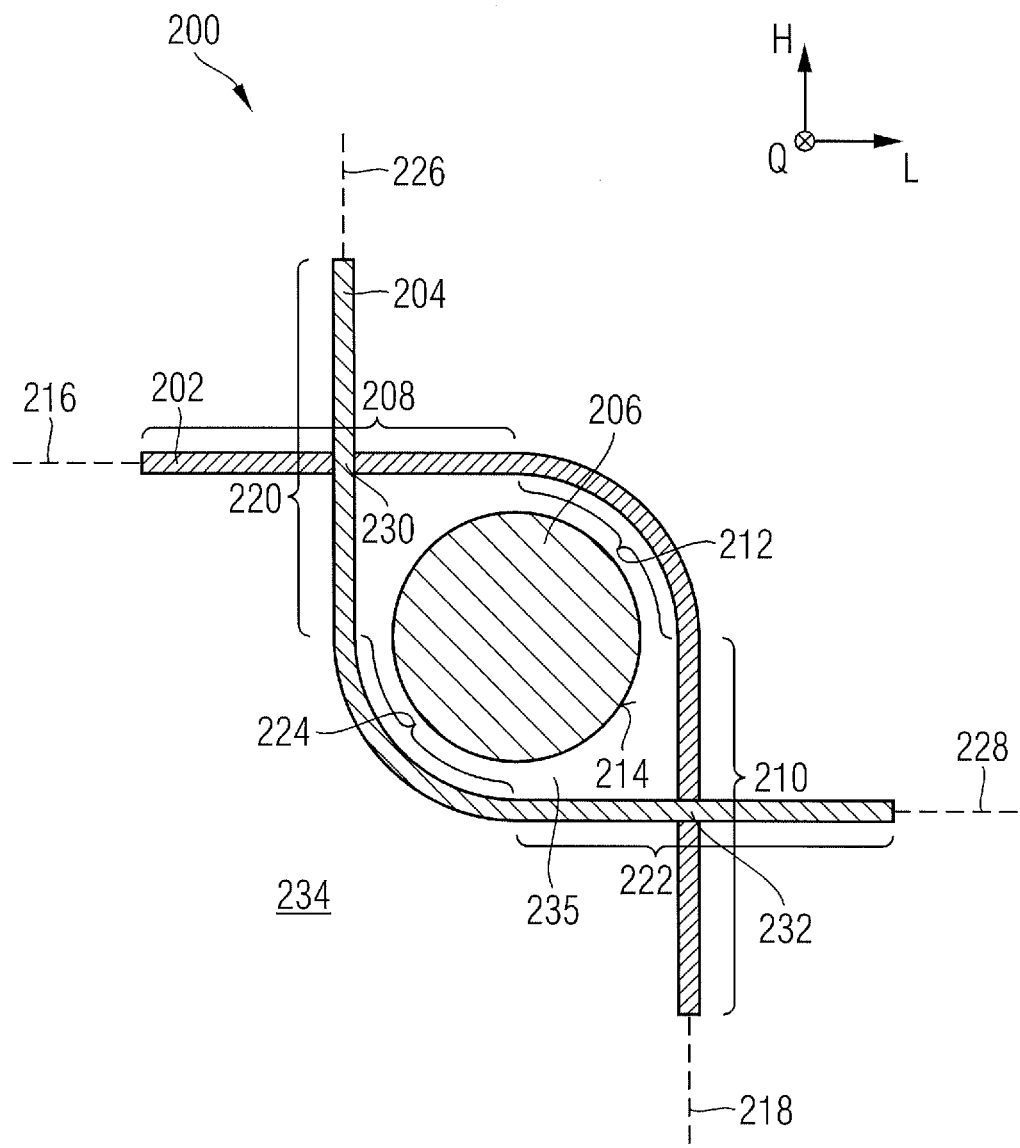
FIG. 2A is a schematic representation of a component according to one embodiment of the present invention.

FIG. 2A is a schematic representation of a component 200 according to one embodiment, kept comparatively general, of the present invention.

Figure 1:
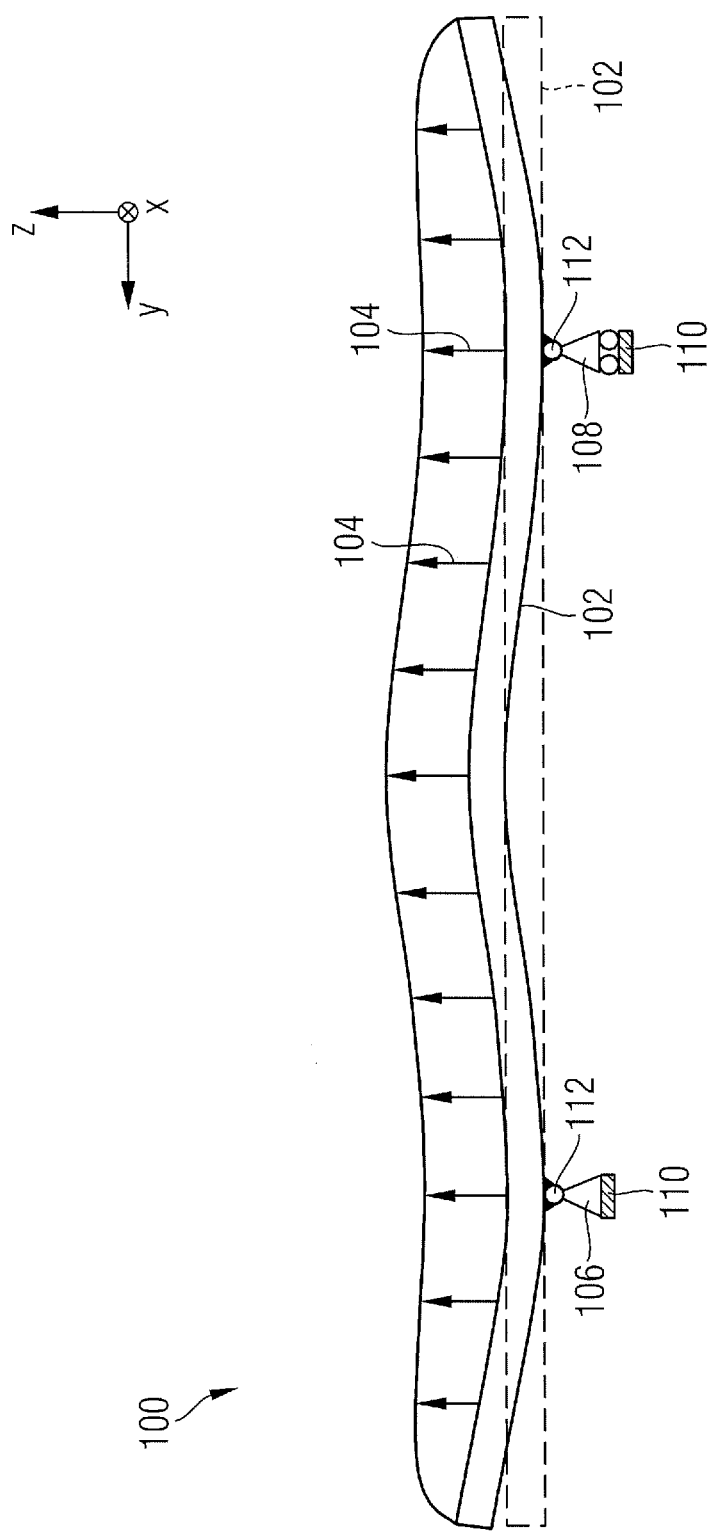
FIG. 1 is a detail of an aircraft.

The component 200 is for example part of the landing flap 102 shown in FIG. 1 and therefore part of the aircraft 100.

In the present case, the three mutually orthogonal spatial directions are referred to as the longitudinal direction L, the transverse direction Q and the vertical direction H. Denoting the three directions serves merely to provide a better understanding of the spatial arrangement of the various elements relative to one another and is not to be taken as limiting. In the installation position of the component 200 in the landing flap 102, the transverse direction Q corresponds to the flow direction X, the longitudinal direction L corresponds to the span direction Y and the vertical direction H corresponds to the vertical direction Z of the landing flap.

The component 200 comprises two fibres 202, 204 which are each placed around a coupling element 206.

The first fibre 202 comprises a first fibre portion 208 in front of the coupling element 206 and a second fibre portion 210 behind the coupling element 206. "In front of" and "behind" in this case relate to a contact region 212 in which the first fibre 202 contacts the outer circumference 214 of the coupling element 206 and therefore wraps around said element in portions. The first fibre portion 208 extends in a first plane 216. The second fibre portion 210 extends in a second plane 218. The first and second planes 216, 218 intersect, for example as shown, at an angle of 90 degrees.

The second fibre 204 also comprises a first fibre portion 220 in front of the coupling element 206 and a second fibre portion 222 behind the coupling element 206. Here, too, "in front of" and "behind" relate to a contact region 224 in which the second fibre 204 contacts the outer circumference 214 of the coupling element 206 and therefore wraps around said element in portions. The first fibre portion 220 extends in a third plane 226. The second fibre portion 222 extends in a fourth plane 228. The third and fourth planes 226, 228 intersect, for example as shown, at an angle of 90 degrees.

Furthermore, the first fibre portions 208, 220 of the first and second fibres 202, 204 intersect in a first region 230. The second fibre portions 210, 222 of the first and second fibres 202, 204 intersect in a second region 232. The first and second regions 230, 232 are at a distance from one another and, for example as shown, are opposite one another relative to the coupling element 206. In addition, the first and third planes 216, 226 preferably intersect at an angle of 90 degrees. Correspondingly, the second and fourth planes 218, 228 preferably also intersect at an angle of 90 degrees. As a result, the first fibre portion 208 of the first fibre 202 and the second fibre portion 222 of the second fibre 204 extend in the longitudinal direction L on both sides of the coupling element 206, but in different planes 216, 228. However, the first fibre portion 220 of the second fibre 204 and the second fibre portion 210 of the first fibre 202 extend in the vertical direction H on both sides of the coupling element 206, but in different planes 218, 226. The coupling element 206 extends in the transverse direction Q.

Typically, a multitude of first and second fibres 202, 204 are provided which each form a strand. The fibres 202, 204 are for example made of carbon, aramid or glass and are infiltrated with a thermosetting or thermoplastic matrix.

The coupling element 206 can be formed in various ways, but should have a high shear strength in planes 234 (paper plane and planes parallel thereto) in which a respective fibre 202, 204 wraps around the coupling element 206.

For example, the coupling element 206 can comprise a multitude of fibres (not shown), in particular made of glass or carbon. The fibres extend exclusively or predominantly in the transverse direction Q, that is to say perpendicular to the respective planes 234. The fibres can be interwoven. The fibres are preferably provided with a thermosetting or thermoplastic matrix which is cured once the component 200 is, for example, installed in the landing flap.

Alternatively, the coupling element 206 is formed from a monolithic material, in particular aluminium or titanium. The coupling element 206 is preferably formed as a rod.

The component 200 can for example be produced in that the first fibre 202 is placed around a first coupling element (not shown) in such a way that the first fibre 202 extends, with the first fibre portion 208, in the first plane 216 in front of the first coupling element and, with the second fibre portion 210, in the second plane 218 behind the coupling element. Hereafter, prior thereto or simultaneously, the second fibre 204 is placed around a second coupling element (not shown) in such a way that the second fibre 204 extends, with the first fibre portion 220, in the third plane 226 in front of the second coupling element and, with the second fibre portion 222, in the fourth plane 228 behind the second coupling element. Subsequently, the first and second coupling elements are removed. In a further step, the first fibre 202 is superposed with the second fibre 204 in such a way that the first fibre portions 208, 220 cross over in a first region 230 and the second fibre portions 210, 222 cross over in a second region 232 and thereby form a closed passage 235, viewed in the transverse direction Q. In this case, the fibres 202 and 204 are in two different planes 234 which are at a distance from one another but are parallel. The third coupling element 206 is inserted through this passage 235, whereby the first and second fibres 202, 204 are interconnected in an interlocking manner.

FIG. 2A shows the coupling element 206 having a circular cross-section. Alternatively, the cross-section of the coupling element 206 is also merely rounded, for example oval, or is triangular or square having rounded corners. The cross-section is preferably constant in the transverse direction Q.

Figure 2B:
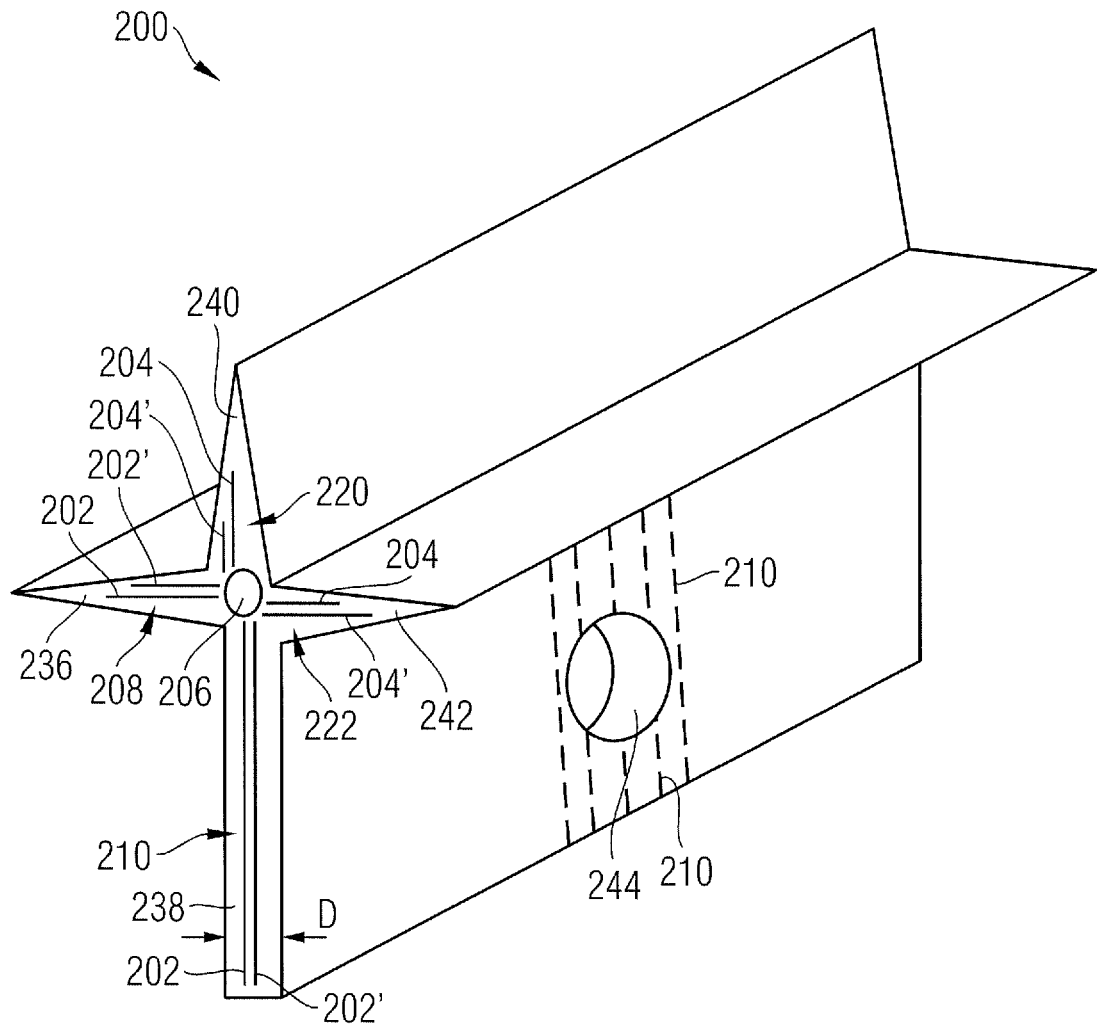
FIG. 2B is a perspective view of the component of FIG. 2A according to a variation.

FIG. 2B is a perspective view of the component 200 of FIG. 2A according to a variation.

First fibre portions 208 of first fibres 202, 202' together form a first arm 236, second fibre portions 210 of the first fibres 202, 202' together form a second arm 238, first fibre portions 220 of second fibres 204, 204' together form a third arm 240 and second fibre portions 222 of the second fibres 204, 204' together form a fourth arm 242. The first and fourth arms 236, 242 are for example mutually offset in the vertical direction H and the second and third arms 238, 240 in the longitudinal direction L. For the purposes of better understanding, the fibres 202, 202', 204, 204' are merely indicated schematically.

For example, three arms 236, 240, 242 can each taper away from the coupling element 206, and this is achieved by correspondingly cutting back the fibres 202, 202', 204, 204'. The arm 238 has a constant thickness D.

The arm 238 is further provided with an eye 244. This is suitable for attaching a flap carriage 106, 108. The multitude of second fibre portions 210 (indicated by dashed lines) adjoin the eye 244 and correspondingly receive loads acting on the eye 244. This load is then conducted into the arm 240 via the coupling element 106. In response, the fibres in the arms 236 and 242 receive reaction forces via the coupling element 206. By means of the coupling element 206, the loads are transmitted from a respective first fibre 202 to a respective second fibre 204 and are then transmitted into the arms 240 and 242 by means of the first and second fibre portions 220, 222.

Figure 2C:
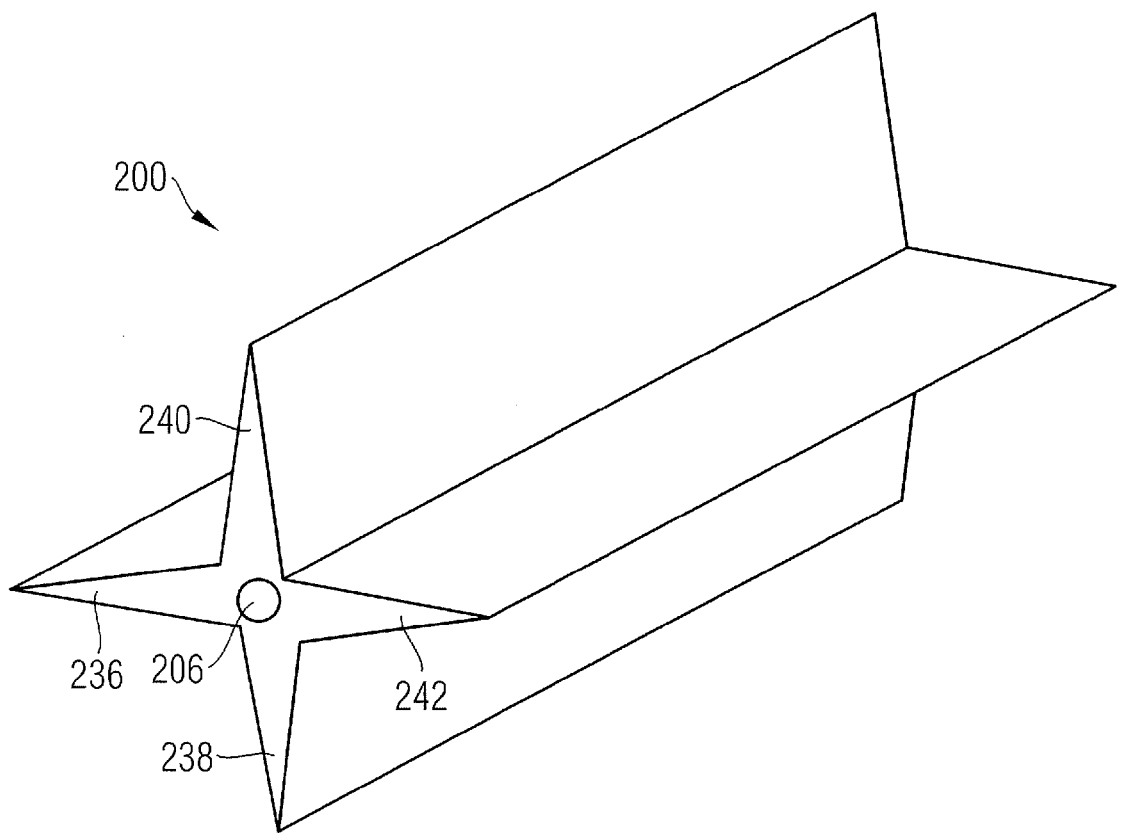
FIG. 2C is a perspective view of the component of FIG. 2B according to a variation.

FIG. 2C is a perspective view of the component 200 of FIG. 2B according to a variation.

In the embodiment according to FIG. 2C, the arm 238 is also configured in such a way that it tapers away from the coupling element 206. In addition, the arm 238 does not comprise an eye.

Figure 3:
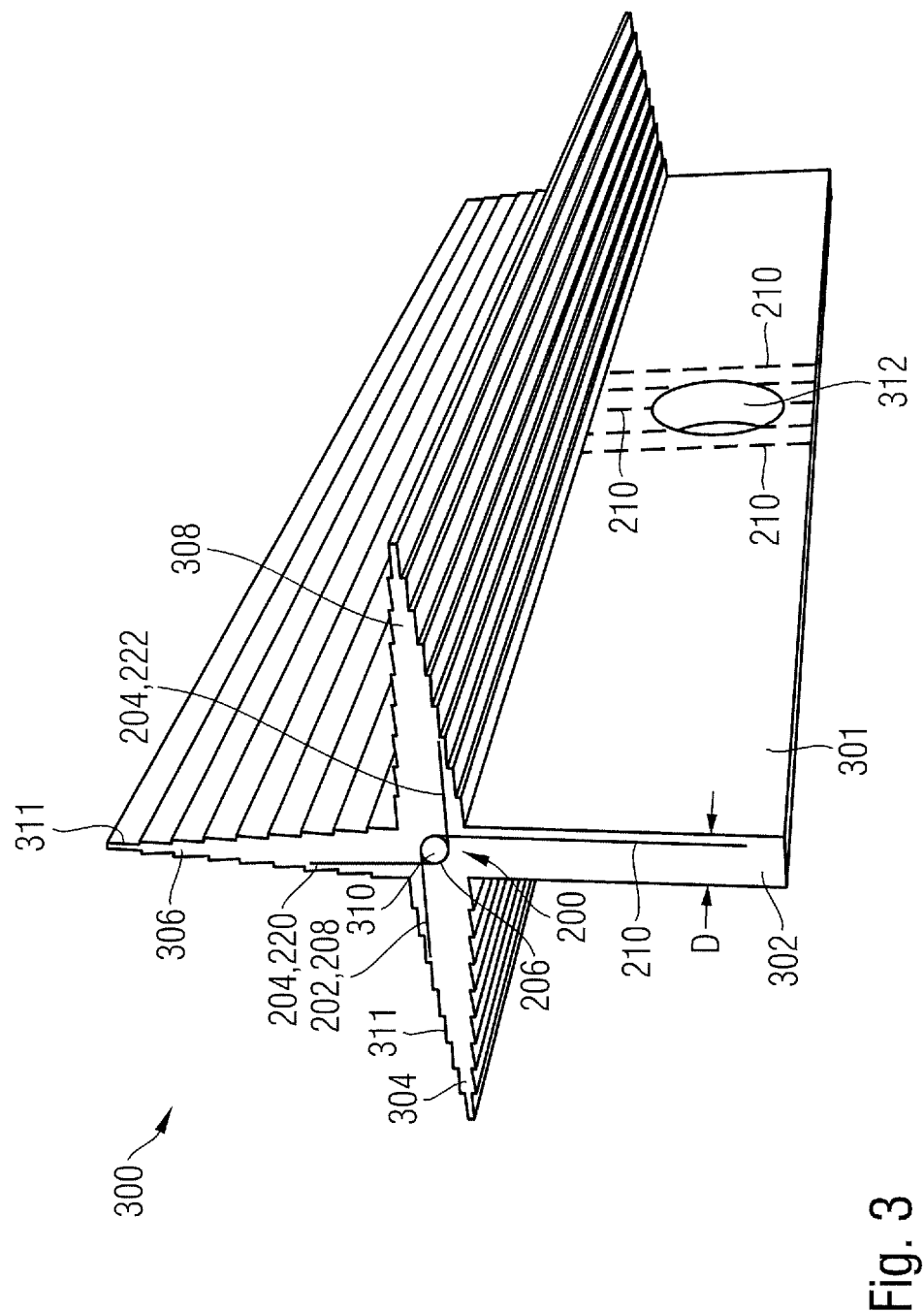
FIG. 3 is a perspective view of a reinforcement member comprising a component of FIG. 2A to 2C according to one embodiment of the present invention.

FIG. 3 is a perspective view of a reinforcement member 300 comprising a component 200 of one of FIG. 2A to 2C. The multitude of fibres 202, 204 is embedded into an embedding part 301. The embedding part 301 has a cruciform cross-section comprising a first, a second, a third and a fourth arm 302, 304, 306, 308. The embedding part 301 preferably comprises a fibre composite material. A fibre portion 208, 210, 220 or 222 is received in an integrated manner in each of the arms 302, 304, 306, 308. The coupling element 206 is in the centre of the cross 310. Owing to the embedding material 301, the reinforcement member 300 can be configured such that the arms 304, 308 are in the same plane QL, that is to say not mutually offset, and the arms 302, 306 are in the same plane HQ, that is to say also not mutually offset.

For example, three of the arms 304, 306, 308 can taper away from the centre of the cross 310 while one arm 302 has a constant thickness D. The tapering of each arm 304, 306, 308 can be provided in the form of a plurality of steps 311.

The arm 302 comprises an eye 312 for fastening, for example, a flap carriage 106, 108 of FIG. 1. The multitude of the second fibre portions 210 (indicated by dashed lines) adjoin the eye 312 and correspondingly receive loads acting on the eye 312, as already explained above in conjunction with FIG. 2B. These loads are then directly conducted into the arm 304 inside a respective first fibre 202 by means of a respective first fibre portion 208. By means of the coupling element 206, the loads are transmitted from a respective first fibre 202 to a respective second fibre 204 and are then transmitted into the arms 306 and 308 by means of the first and second fibre portions 220, 222.

Figure 4A:
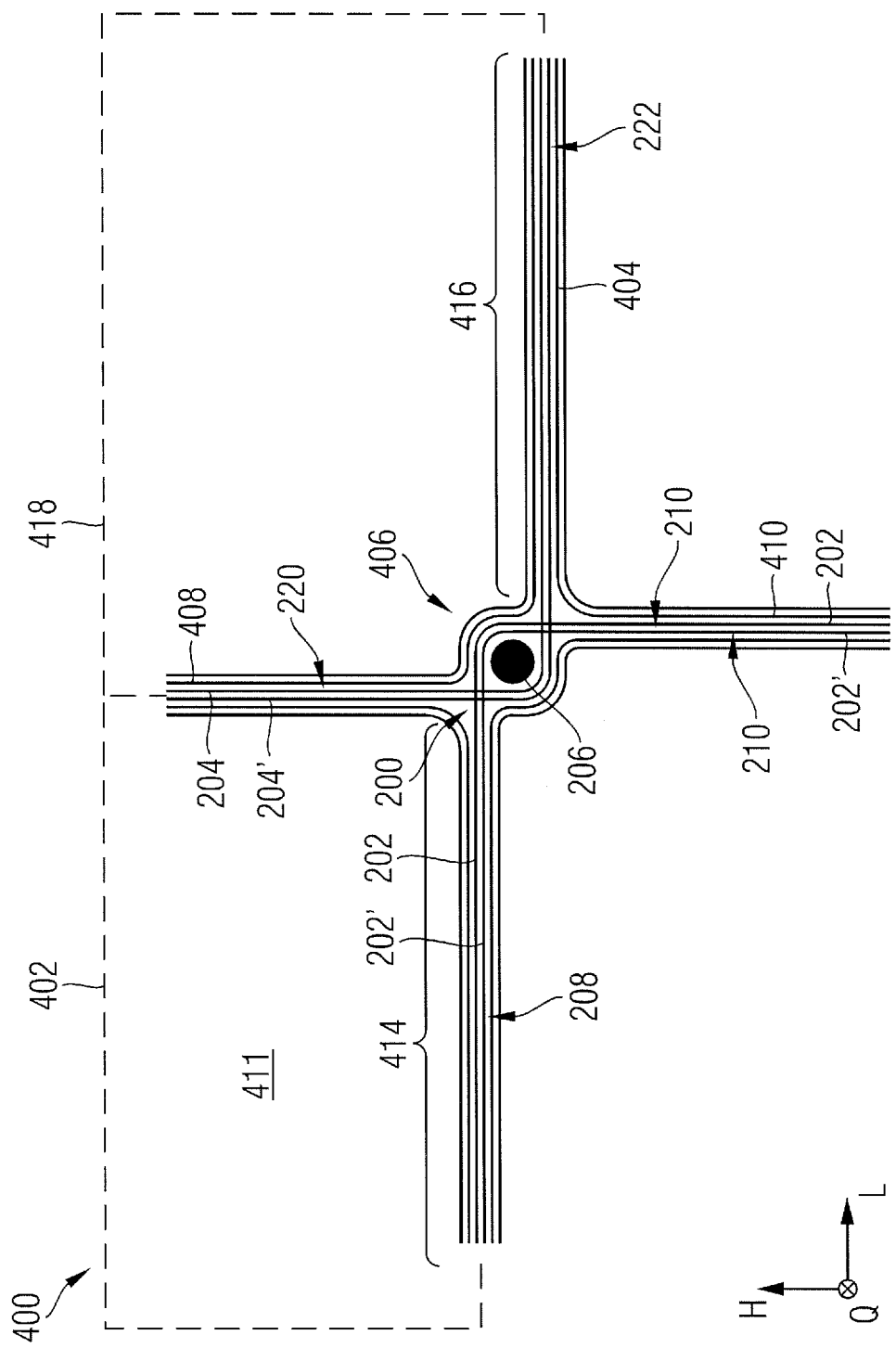
FIG. 4A is a partial section through a structural arrangement according to one embodiment of the present invention.

FIG. 4A is a partial section through a structural arrangement 400 according to one embodiment of the present invention.

The structural arrangement 400 comprises a substantially closed box structure 402 (only shown in part). In the present case, "substantially closed" includes a box structure having a completely closed outer contour and a box structure having comparatively small openings in the outer contour.

The box structure 402 comprises in particular a lower outer wall 404. The lower outer wall 404 forms an intersection region 406 comprising an internal and an external web 408, 410 of the structural arrangement 400. The internal web 408 is arranged inside the box structure 402, that is to say in an internal space 411 thereof, and the external web 410 is arranged outside the box structure 402.

The component 200 according to the embodiment described in conjunction with FIG. 2B is arranged in the intersection region 406. The second portions 210 of the first fibres 202, 202' extend inside the external web 410, the first portions 220 of the second fibres 204, 204' extend inside the internal web 408, the first portions 208 of the first fibres 202, 202' extend inside a first portion 414 of the outer wall 404 and the second portions 222 of the second fibres 204, 204' extend inside a portion 416 of the outer wall 404 which is opposite the first portion 414. The portions 220, 210 are rigidly connected to the respective webs 408, 410 thereof and the portions 208, 222 are rigidly connected, in particular adhered, to the respective portions 414, 416 thereof. For the sake of clarity, a corresponding resin matrix 412 is only shown in part.

The component 200 can be glued into the box structure 402 and into the webs 408, 410 in various ways. The completely or partly cured component 200 can be cured together with the wet box structure 402 (prepreg) and the wet webs 408, 410 (prepreg). Furthermore, the completely or partly cured component 200 can be structurally adhered to the completely or partly cured box structure 402 and the completely or partly cured webs 408, 410. Yet further, the dry component 200 and the dry box structure 402 and dry webs 408, 410 can be infiltrated and cured together. Furthermore, the wet component 200 and the wet box structure 402 and wet webs 408, 410 can be adhered to one another.

The internal web 408 can be configured as a rib or spar which is connected in particular to an upper outer wall 418 of the box structure 402.

Figure 4B:
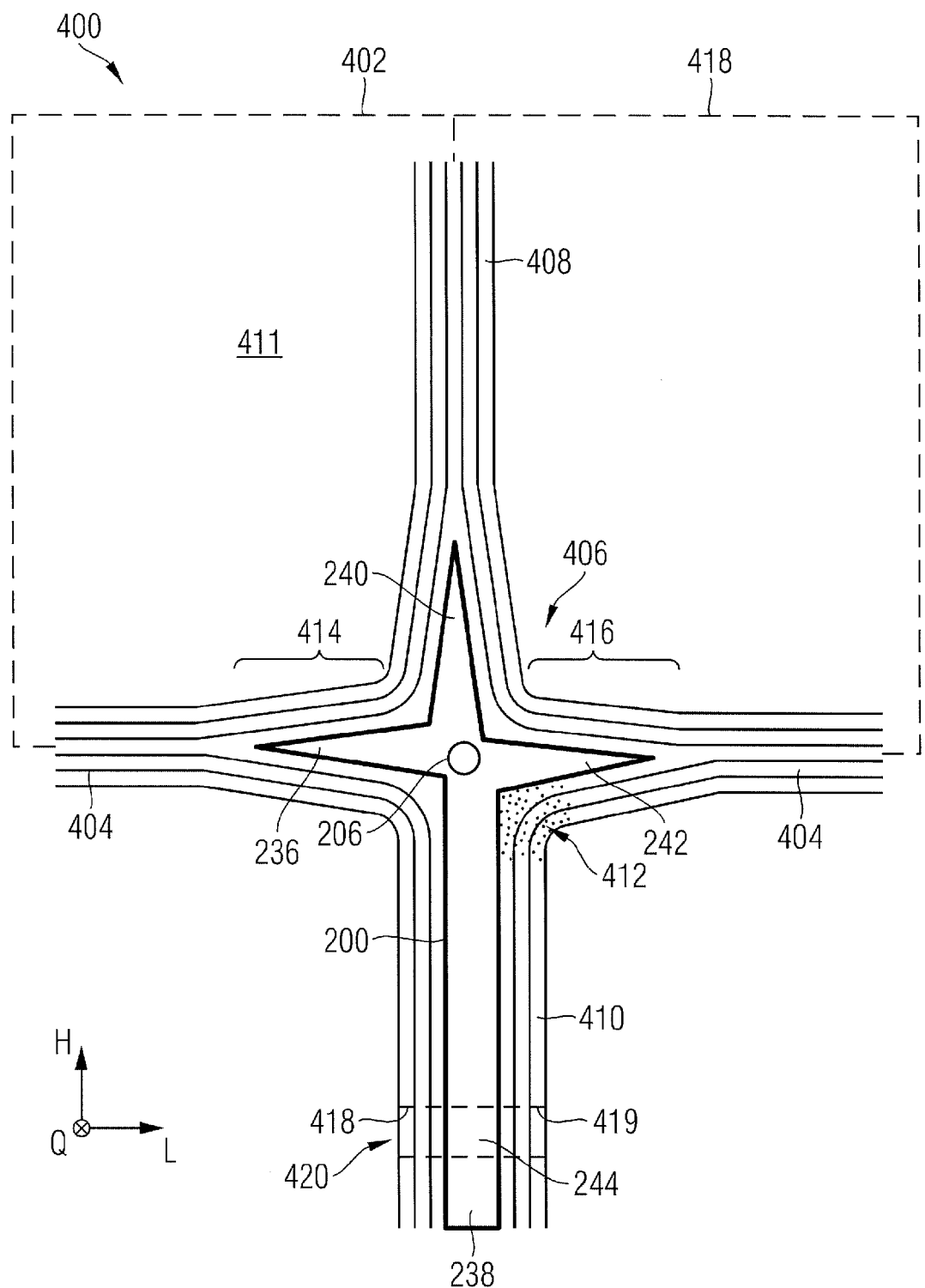
FIG. 4B is a partial section through a structural arrangement according to a variation on FIG. 4A.

FIG. 4B is a partial section through a structural arrangement 400 according to a variation on FIG. 4A.

In the structural arrangement 400 according to FIG. 4B, the component 200 of FIG. 2B is integrated into the structural arrangement 400 of FIG. 4A. While for example, as indicated in FIG. 4A, the fibre portions 208, 222 can extend in the longitudinal direction L inside the lower wall 404 over the entire extension thereof, the tapering arms 236, 242 of the component 200 are configured to be comparatively short in FIG. 4B and extend in the longitudinal direction L inside the lower wall 404 only over part of the entire extension of said lower wall 404. The same applies to the upper tapering arm 240 in the internal web 408.

The eye 244 in the component 200 forms an eye 420 together with corresponding passages 418, 419 in the external web 410. This is suitable for attaching a flap carriage 106, 108.

Figure 4C:
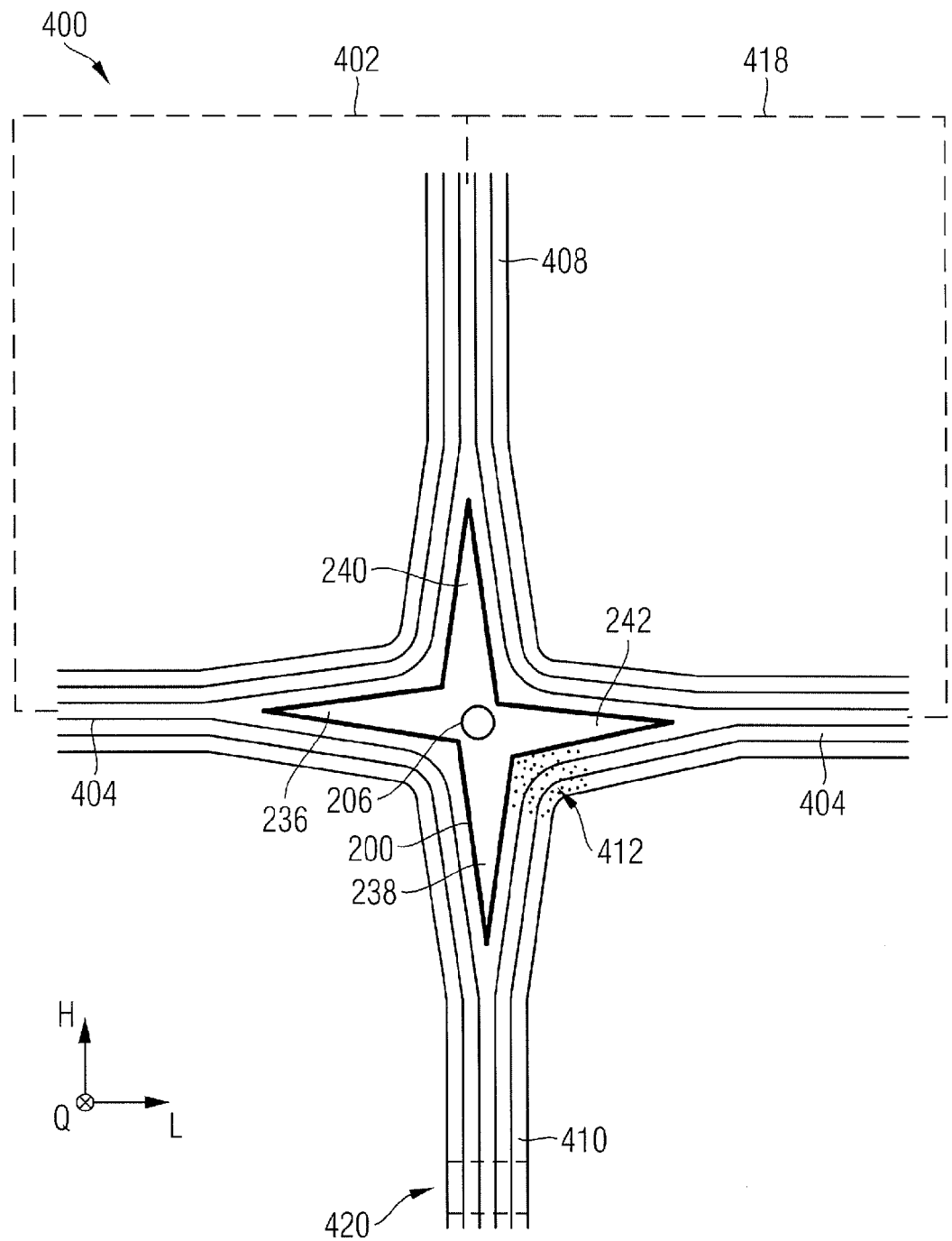
FIG. 4C is a partial section through a structural arrangement 400 according to a variation on FIG. 4B.

FIG. 4C is a partial section through a structural arrangement 400 according to a variation on FIG. 4B.

In the structural arrangement 400 according to FIG. 4C, the component 200 of FIG. 2C is integrated into the structural arrangement 400 of FIG. 4B. In contrast to FIG. 4B, the lower tapering arm 238 extends in the vertical direction H inside the external web 410 only over part of the entire extension of said external web 410. The external web 410 can comprise an eye 420 which the arm 238 does not penetrate by said eye being arranged at a distance therefrom in the vertical direction.

Figure 4D:
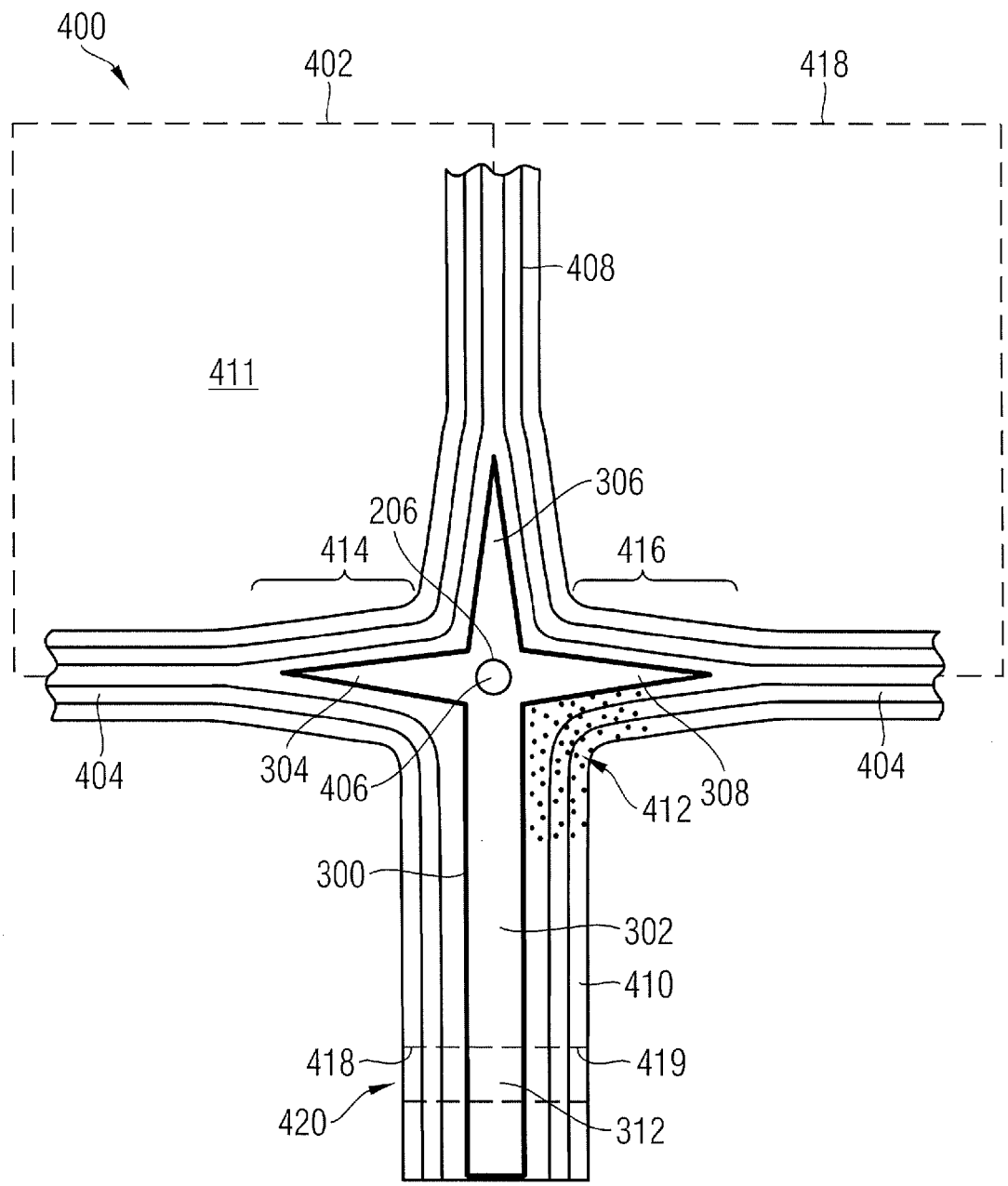
FIG. 4D is a partial section through a structural arrangement together with the reinforcement member of FIG. 3 according to a further embodiment of the present invention.

FIG. 4D is a partial section through a structural arrangement 400 according to a further embodiment of the present invention.

Instead of the component 200, as in the embodiments according to FIG. 4A to 4C, the reinforcement member 300 of FIG. 3 is arranged in the intersection region 406. The first arm 302 extends inside the external web 410, the third arm 306 extends inside the internal web 408, the second arm 304 extends inside the first portion 414 and the fourth arm 308 extends inside the portion 416. The arms 302, 306 are rigidly connected to the respective web 408, 410 thereof and the arms 304, 308 are rigidly connected, in particular adhered, to the respective portion 414, 416 thereof, in particular adhered. For the sake of clarity, a corresponding resin matrix 412 is only shown in part.

The reinforcement member 300 can be glued into the box structure 402 and into the webs 408, 410 for example in the way which is described for the component 200 in conjunction with the embodiment according to FIG. 4A.

The eye 312 in the reinforcement member 300 forms an eye 420 together with corresponding passages 418, 419 in the external web 410.

Figure 5A:
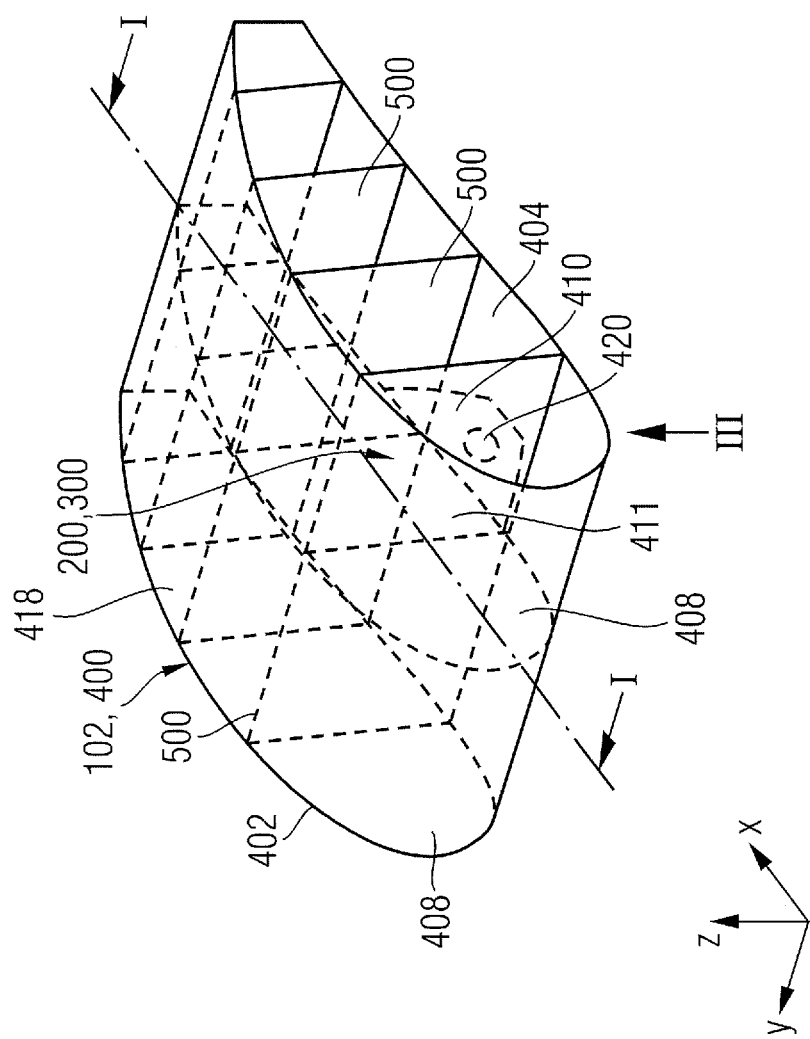
FIG. 5A is a perspective view of a structural arrangement according to a further embodiment of the present invention.

FIG. 5A is a perspective view of a structural arrangement 400 according to a further embodiment of the invention. The structural arrangement 400 forms part of a landing flap 102.

The structural arrangement 400 comprises a substantially closed box structure 402 which forms the outer wall of the aerodynamic profile of the landing flap 102. In the Y direction, that is to say the span direction, the box structure 402 is preferably open. Internal webs 408 in the form of transverse ribs and transverse webs 500 extend inside the box structure 402.

A reinforcement member 300 is integrated into the box structure 402 and a transverse rib 408, as described with reference to FIG. 3, in such a way that the arm 302 of said rib extends downwards in the Z direction. The arm 306 points into the inner space 411 of the box structure 402 and is preferably integrated into the transverse rib 408. The arms 304, 308 are integrated into the lower outer wall 404. The external web 410 extends downwards from the lower outer wall 404 and forms the eye 420. The eye 420 is therefore arranged below the box structure 402 and is thus well suited to being connected to a flap carriage 106, 108 (not shown).

Figure 5B:
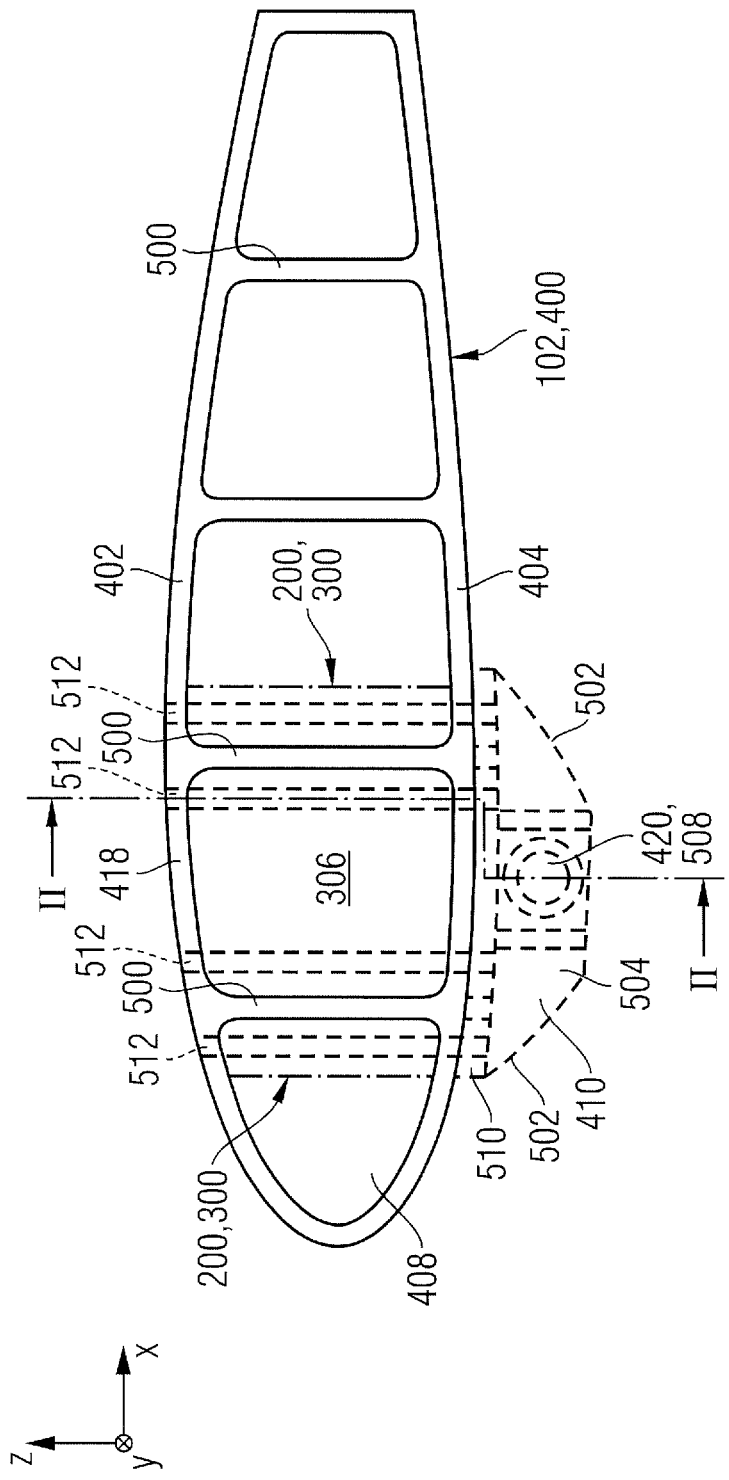
FIG. 5B is a sectional view along line I-I from FIG. 5A.

As can be seen from the sectional view along line I-I from FIG. 5A which is shown in FIG. 5B and shows a more specific configuration compared with FIG. 5A, the arm 306 is inside the transverse rib 408, which is preferably connected over the entire circumference thereof to the box structure 402. The left-hand and right-hand ends of the arm 306 in FIG. 5B are indicated by a dot-dash line. With reference to FIG. 5B, it is to be noted in particular that the transverse rib 408 and preferably the arm 306 attach at the top to the upper outer wall 418 of the box structure 402, that is to say are fastened thereto.

The external web 410 can comprise bevels 502 in order to additionally save material.

Figure 5C:
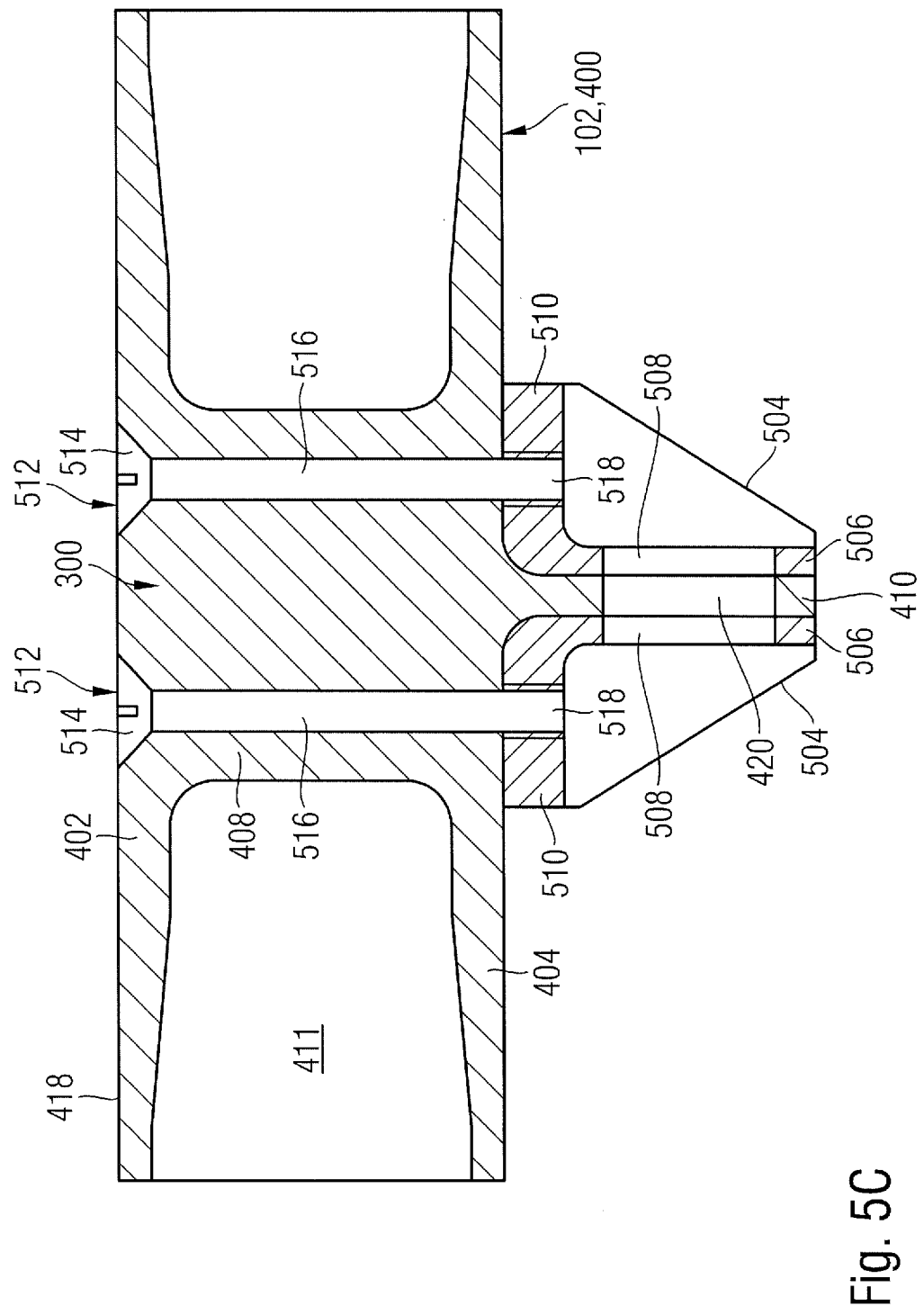
FIG. 5C is a sectional view along line II-II from FIG. 5B.

FIG. 5C is a sectional view along line II-II from FIG. 5B. With a view to a more simplified representation, FIG. 5C does not differentiate between the material of the reinforcement member 300 and the material of the box structure 402 and the webs 408, 410.

With reference to FIG. 5C, it is shown that the structural arrangement 400 can further comprise a pair of angular parts 504, for example made of fibre composite material or metal, which are arranged on both sides of the external web 410 and reinforce the eye 420. The angular parts 504 each comprise webs 506 together with eyes 508, which correspond to the eye 420. The angular parts 504 each further comprise a foot 510 with which they contact the lower outer wall 404. The feet 510 are each fastened by four bolts 512 to the box structure 402. The bolts 512 can comprise a head 514, with which they engage behind the upper outer wall 418, and the shaft 516 thereof can extend through the reinforcement member 300. The end 518 of each shaft 516 is screwed to the corresponding foot 510.

Figure 5D:
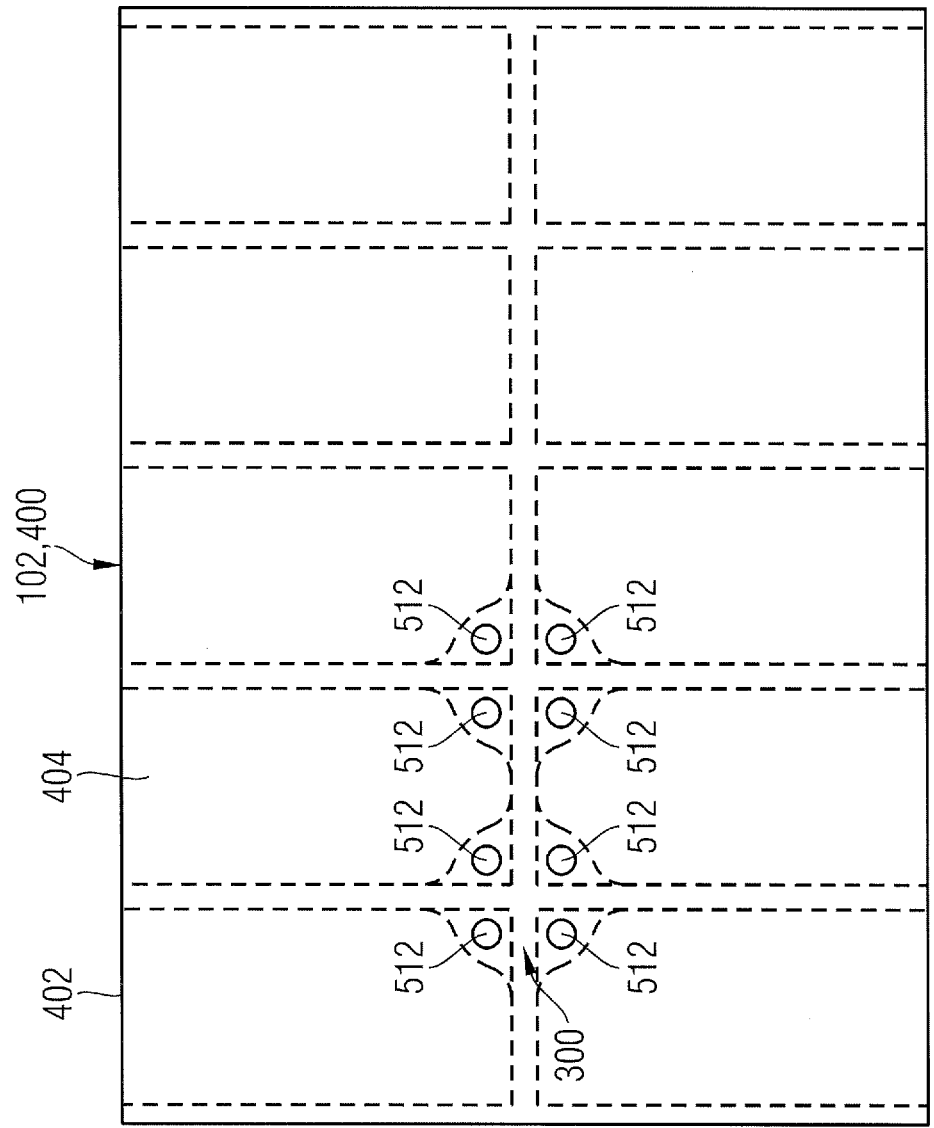
FIG. 5D is a view III from FIG. 5A.

As is to be noted with reference to FIG. 5D, which is a view III from below from FIG. 5A, eight bolts 512 can be provided per reinforcement member 300 which penetrate said member or are arranged contiguously thereto. For the sake of clarity, in FIG. 5D the angular parts 504 and also the external web 410 are not shown.

Instead of the reinforcement member 300, a component 200 according to one of the embodiments described herein could equally be used.

Figure 6:
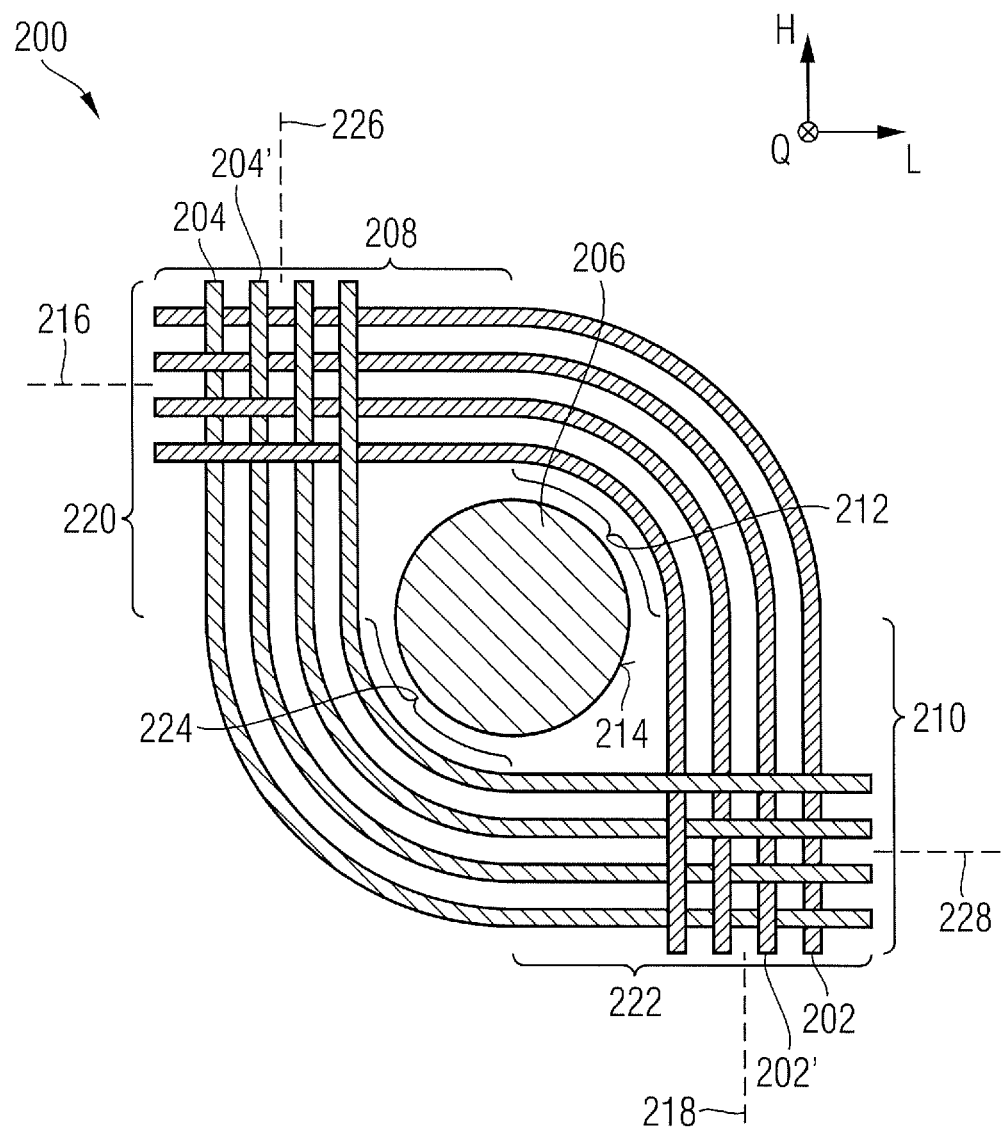
FIG. 6 is a schematic view of a component according to a further embodiment of the present invention.

FIG. 6 is a schematic view of a component 200 according to a further embodiment of the present invention.

In contrast to the embodiment according to FIG. 2A, the component 200 according to FIG. 6 comprises a plurality of first fibres 202, 202' which are arranged so as to alternate with a plurality of second fibres 204, 204' in the transverse direction Q.

Figure 7:
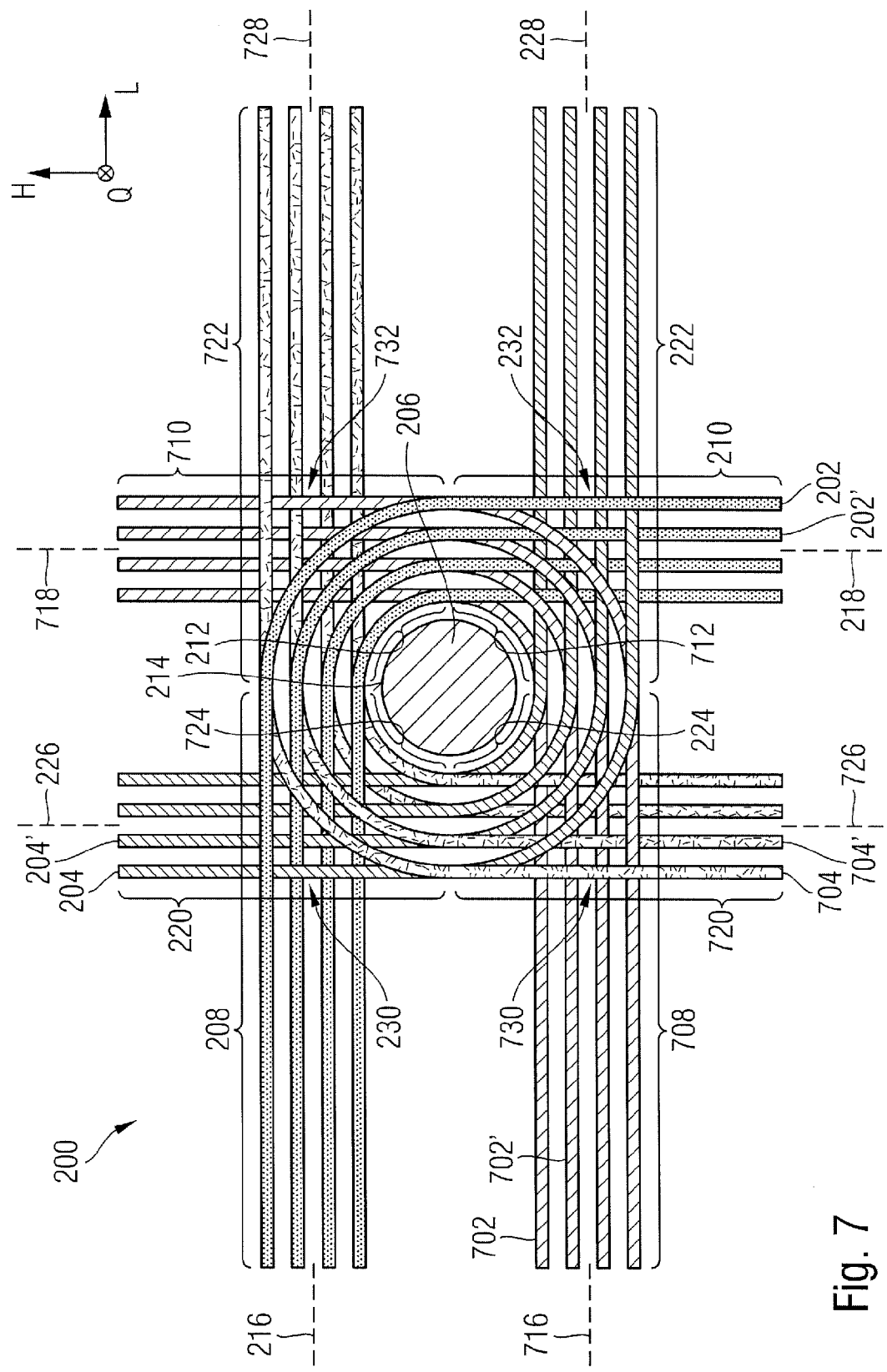
FIG. 7 is a schematic view of a component according to yet another embodiment of the present invention.

FIG. 7 is a schematic view of a component 200 according to yet another embodiment of the present invention.

In contrast to the embodiment according to FIG. 6, the component 200 according to FIG. 7 additionally comprises a plurality of third fibres 702, 702' and fourth fibres 704, 704'.

Each third fibre 702, 702' comprises a first fibre portion 708 in front of the coupling element 206 and a second fibre portion 710 behind the coupling element 206. In the present case, "in front of" and "behind" refer to a contact region 712 in which the third fibre 702 (in this instance, "fibre" always means "each" fibre, unless otherwise stated) contacts the outer circumference 214 of the coupling element 206 and therefore wraps around said element in portions. The first fibre portion 708 extends in a fifth plane 716. The second fibre portion 710 extends in a sixth plane 718. The fifth and sixth planes 716, 718 intersect, for example as shown, at an angle of 90 degrees.

Each fourth fibre 704 also comprises a first fibre portion 720 in front of the coupling element 206 and a second fibre portion 722 behind the coupling element 206. Here, too, "in front of" and "behind" refer to a contact region 724 in which the fourth fibre 704 contacts the outer circumference 214 of the coupling element 206 and therefore wraps around said element in portions. The first fibre portion 720 extends in a seventh plane 726. The second fibre portion 722 extends in an eighth plane 728. The seventh and eighth planes 726, 728 intersect, for example as shown, at an angle of 90 degrees.

Furthermore, the first fibre portions 708, 720 of the third and fourth fibres 702, 702', 704, 704' intersect in a third region 730. The second fibre portions 710, 722 of the third and fourth fibres 702, 702', 704, 704' intersect in a fourth region 732. The third and fourth regions 730, 732 are at a distance from one another and, for example as shown, are opposite one another relative to the coupling element 206, in such a way that the intersection regions 230, 232, 730, 732 are at the corners of a rectangle. In addition, the fifth and seventh planes 716, 726 preferably intersect at an angle of 90 degrees. Correspondingly, the sixth and eighth planes 718, 728 also preferably intersect at an angle of 90 degrees. As a result, the first fibre portion 708 of the third fibre 702 and the second fibre portion 722 of the fourth fibre 704 extend in the longitudinal direction L on both sides of the coupling element 206 in different planes. However, the first fibre portion 720 of the fourth fibre 704 and the second fibre portion 710 of the third fibre 702 extend in the vertical direction H on both sides of the coupling element 206. The planes 216, 728, the planes 226, 726, the planes 228, 716 and the planes 218, 718 are each in the same plane. The planes 216, 728 are arranged so as to be offset to the planes 228, 716 in a parallel manner in the vertical direction. The planes 226, 726 are arranged so as to be offset to the planes 218, 718 in a parallel manner in the longitudinal direction L.

By means of the component 200 shown in FIG. 7, during installation thereof in a box structure 402 and webs 408, 410 (see one of FIG. 4A to 4C), it is achieved that the wall portions 414, 416 can be arranged in the same plane and the webs 408, 410 can be arranged in the same plane, and not in different planes (as is the case in FIG. 4A to 4C).

Figure 7A:
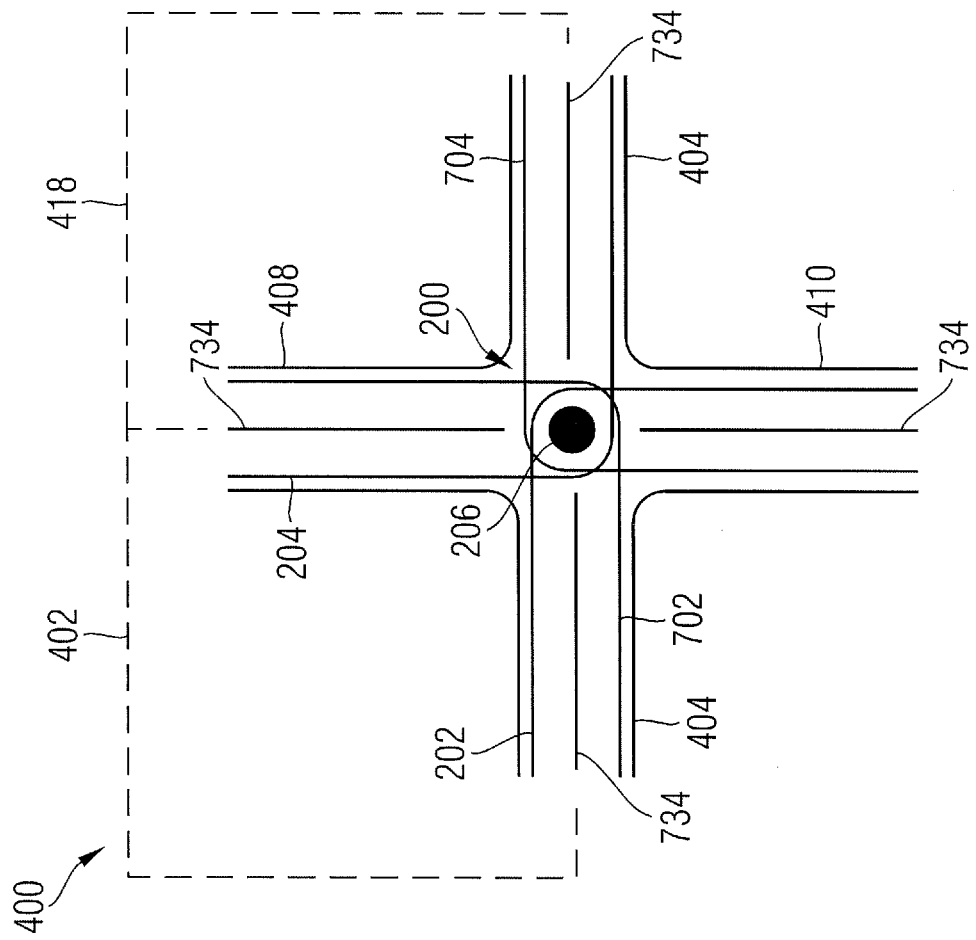
FIG. 7A is a basic view of a structural arrangement together with the component 200 of FIG. 7.

FIG. 7A is a basic view of a structural arrangement 400 together with the component 200 of FIG. 7.

Additional layers 734 are introduced, in particular glued, into intermediate spaces respectively formed between the fibres 202, 702, the fibres 202, 704, the fibres 204, 702 and the fibres 204, 704. Together with these layers 734, the component 200 is surrounded in this case by external fibres 404, 408 via which said component is inserted into the box structure 402.

Figure 8:
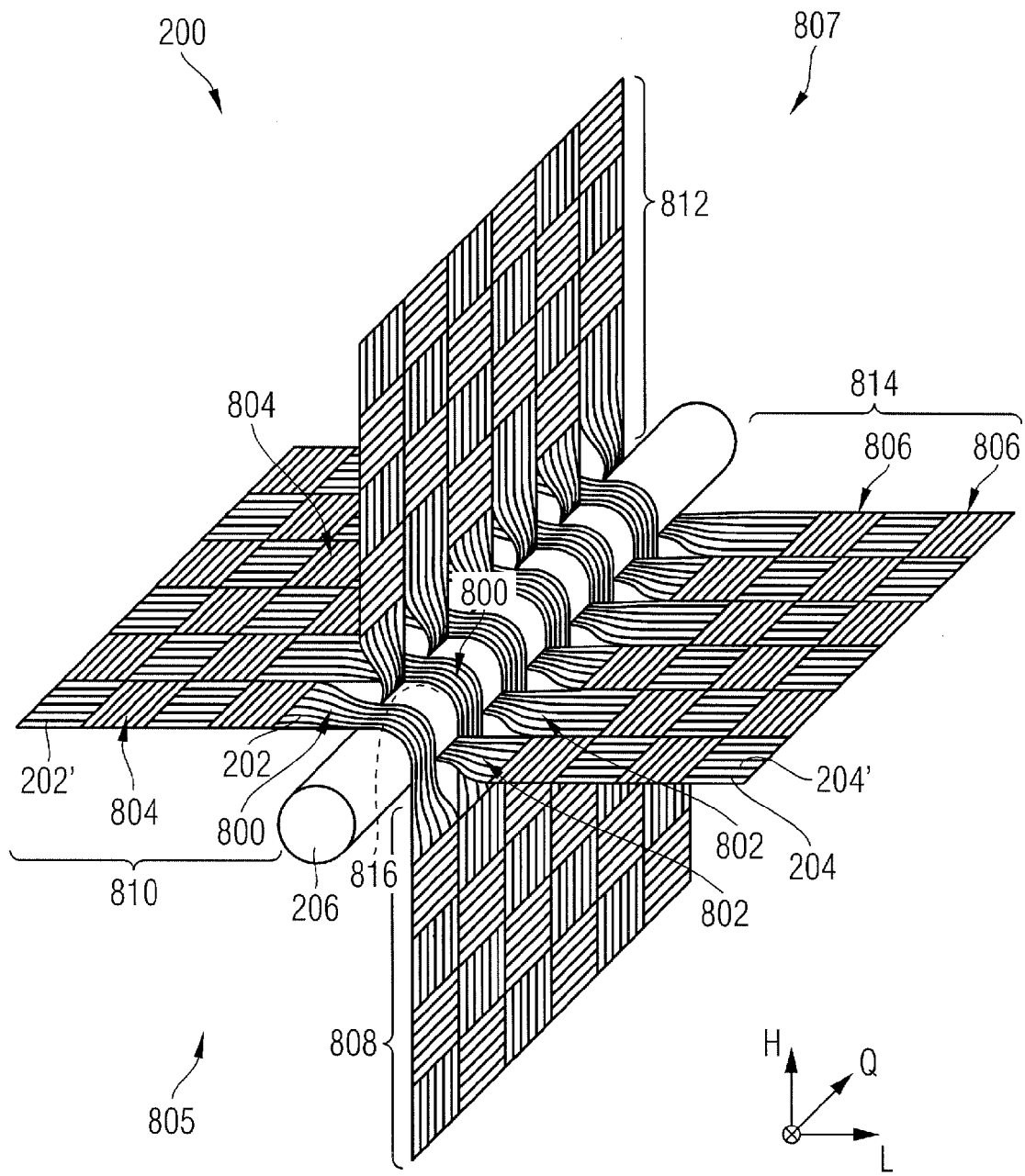
FIG. 8 is a perspective view of a component according to yet another embodiment of the present invention.

FIG. 8 is a perspective view of a component 200 according to yet another embodiment of the present invention.

The component 200 comprises first fibres 202 which form a plurality of first fibre strands 800. Furthermore, the component 200 comprises second fibres 204 which form a plurality of second fibre strands 802. The fibre strands 800, 802 wrap around the coupling element 206 in such a way that they alternate in the transverse direction Q.

The first fibre strands 800 are interwoven with third fibre strands 804 which extend in the transverse direction Q. Correspondingly, fourth fibre strands 806 are interwoven with the second fibre strands 802.

The two separate woven fabrics 805, 807 thus formed can be easily glued into an intersection region 406 of a structural arrangement 400 or connected thereto in another way. A first woven fabric portion 808 of the woven fabric 805 is preferably glued into an external web 410, see for example FIG. 4A, a second woven fabric portion 810 of the woven fabric 805 is glued into a first portion 414 of a box structure 402, a first woven fabric portion 812 of the woven fabric 807 is glued into an internal web 408 and a second woven fabric portion 814 of the woven fabric 807 is glued into a second portion 416 of the box structure 402, or they are connected to said webs or portions in another way.

The necessary clearance for pushing the coupling element through the woven fabric 805, 807 is for example created in that a fibre strand 804 is omitted in a first woven fabric 805 and a fibre strand 806 is omitted in a second woven fabric 807. Subsequently, the woven fabrics 805, 807 are each bent in the region of the omitted fibre strand 804, 806 and are arranged in such a way that the first and second fibre strands 800, 802 overlap. Hereafter, the coupling element is pushed through the closed passage 816 which is formed.

Figure 9A:
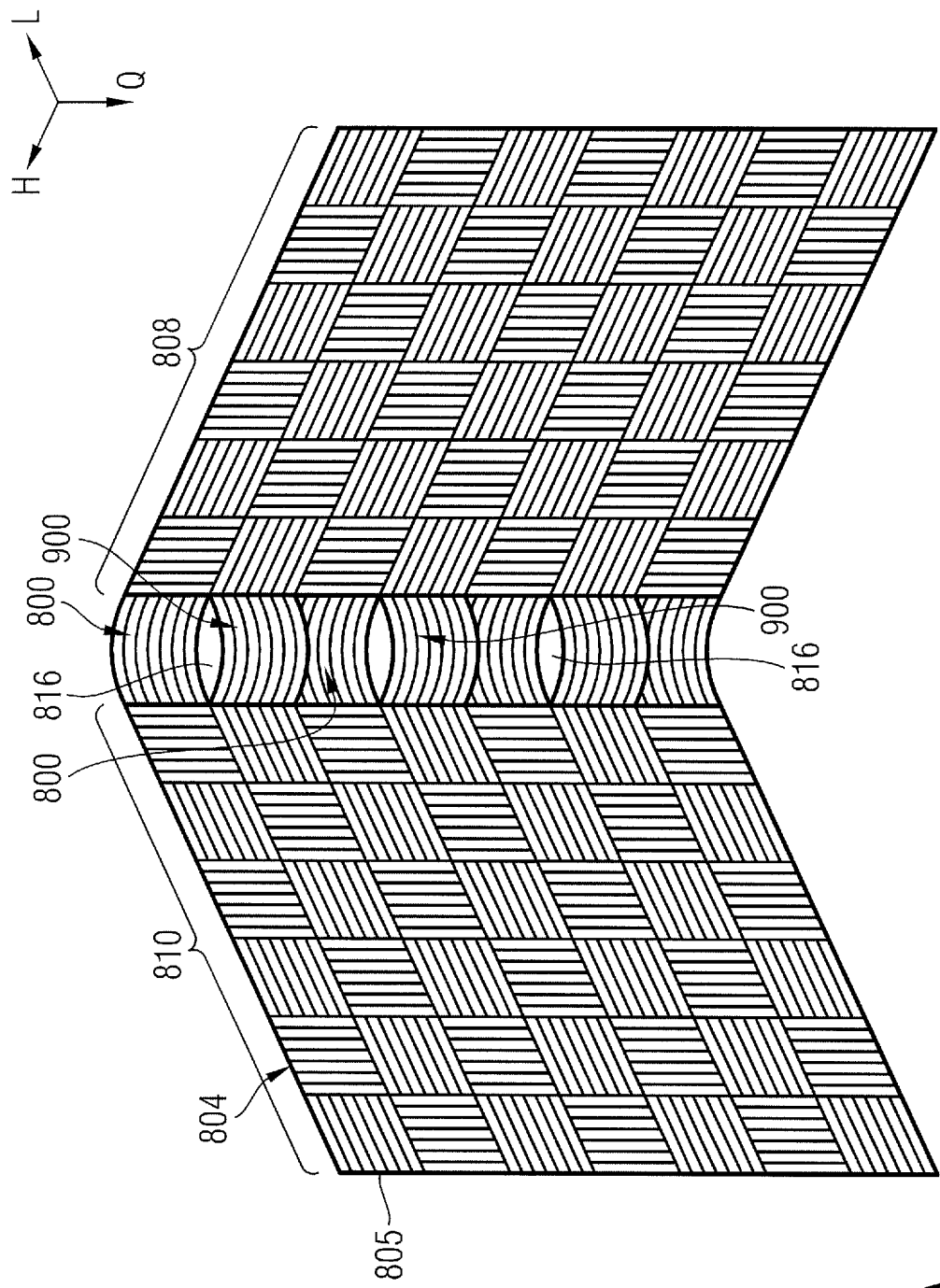
FIG. 9A is a perspective view of a woven fabric according to a variant on FIG. 8.

FIG. 9A is a perspective view of a woven fabric 805 according to a variant on the embodiment according to FIG. 8. In this case, the angular woven fabric 805 points away from the observer.

The woven fabric 805 comprises five fibre strands 900 which form the closed passage 816 together with the first fibre strands 800 in the LH plane and also preferably extend parallel to the first fibre strands 800. In addition, the fifth fibre strands 900 are arranged so as to alternate together with the first fibre strands 800 in the transverse direction Q and are interwoven with the third fibre strands 804.

Figure 9B:
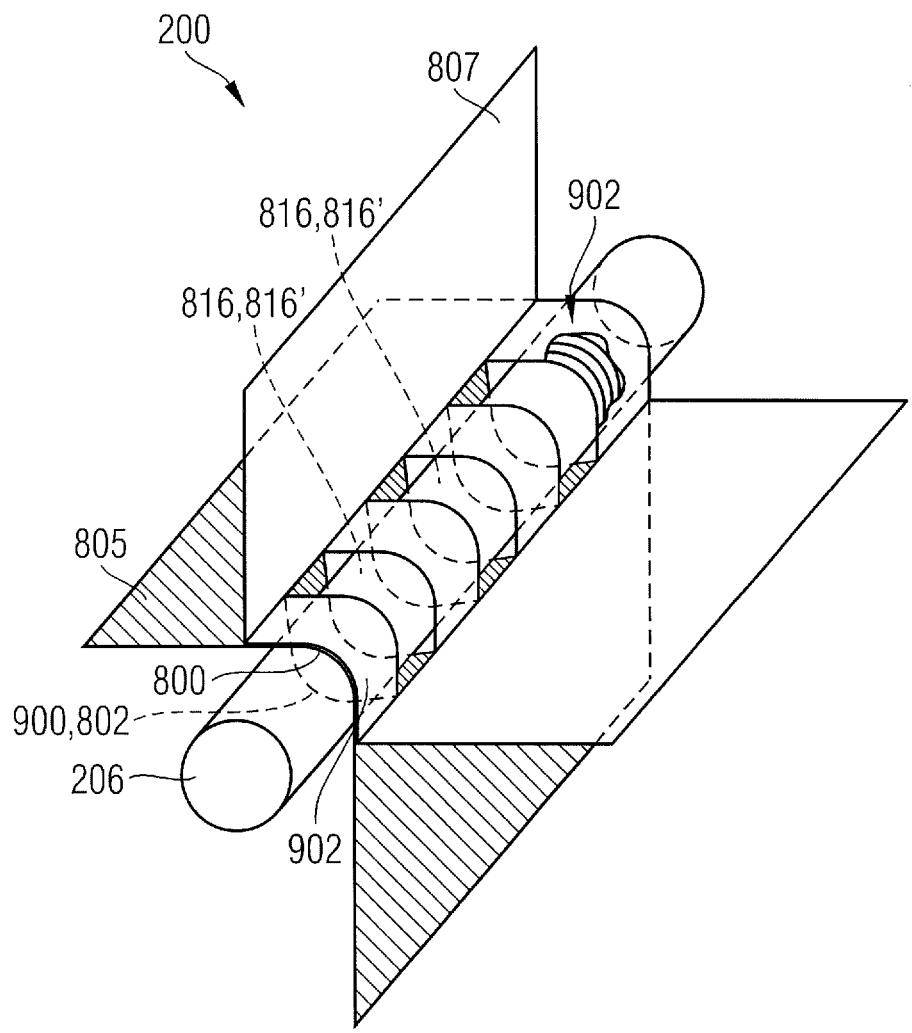
FIG. 9B is a perspective view of a component according to yet another embodiment of the present invention.

Correspondingly, the woven fabric 807 shown in FIG. 9B comprises sixth fibre strands 902 (corresponding fibres are shown in a partially transparent view) which are interwoven with the fourth fibre strands 806 and form second closed passages 816' together with the second fibre strands 802.

FIG. 9B is a perspective view of a component 200 according to a further embodiment of the present invention.

The component 200 comprises two woven fabrics 805, 807 which are each formed according to the model in FIG. 9A. The woven fabrics 805, 807 are overlapped at the respective passages 816, 816' thereof. The coupling element 206 is inserted through the passages 816, 816'.

The component 200 can for example be produced in that, when weaving the first woven fabric 805, a first coupling element is pushed into a formed compartment (not shown) instead of the weft thread. When weaving the second woven fabric 807, a second coupling element is pushed into a formed compartment (not shown) instead of the weft thread. Subsequently, the first and second coupling elements are pulled out, which then overlaps the formed passages 816, 816' and a (third) coupling element 206 is inserted through said passages. Hereafter, the first and second woven fabrics 805, 807 are rigidly interconnected by means of the third coupling element 206. The first and second coupling elements can each be provided as the shown coupling element 206.

The components 200 of FIGS. 8 and 9B can be used in the same way as described above for the components 200 of the previous embodiments.

The fibres 202, 204, 702, 704 and the fibres which are not referred to in detail of the above-mentioned fibre-strands 804, 806, 900, 902 can for example be made of carbon, glass and/or aramid.

Although the present invention has been disclosed by way of preferred embodiments, it is not in any way limited thereto, but can be modified in various ways. In particular, the embodiments and configurations which are mentioned for the component according to the invention can be used correspondingly for the reinforcement member according to the invention, the structural arrangement according to the invention, the vehicle according to the invention and the method according to the invention, and vice versa. Furthermore, "a" or "one" does not exclude a plurality in the present case. In particular, the structural arrangement according to the invention can not only be used for landing flaps, but also for complete box structures such as control flaps.

What is claimed is:

1. A component for connecting structures to intersection regions of said component, for an aircraft or spacecraft, comprising a coupling element, comprising a first fibre which wraps around the coupling element in such a way that the first fibre extends, with a first fibre portion, in a first plane in front of the coupling element and, with a second fibre portion, in a second plane behind the coupling element, the first and second planes intersecting, and comprising a second fibre which wraps around the coupling element in such a way that the second fibre extends, with a first fibre portion, in a third plane in front of the coupling element and, with a second fibre portion, in a fourth plane behind the coupling element, the third and fourth planes intersecting, the first fibre portions of the first and second fibres crossing over in a first region and the second fibre portions of the first and second fibres crossing over in a second region.

2. The component according to claim 1, wherein the first and second planes are arranged substantially perpendicular to one another or the third and fourth planes are arranged substantially perpendicular to one another.

3. The component according to claim 1, wherein the coupling element comprises one or more fibres which are interwoven, the one or more fibres extending in a direction perpendicular to a plane in which the first or second fibre wraps around the coupling element.

4. The component according to claim 3, wherein the one or more fibres comprise glass or carbon or are provided with a thermoplastic or thermosetting matrix.

5. The component according to claim 3, wherein the coupling element is formed, in the shape of a rod from a monolithic material, wherein the monolithic material is aluminium or titanium.

6. The component according to claim 1, wherein the coupling element has a rounded, circular cross-section in a plane in which the first or second fibre wraps around the coupling element.

7. The component according to claim 1, wherein a multitude of first fibres, which form a plurality of first fibre strands and a multitude of second fibres are provided which form a plurality of second fibre strands which are arranged so as to alternate with the first fibre strands in a direction perpendicular to a plane in which a respective first or second fibre wraps around the coupling element.

8. The component according to claim 7, wherein the first fibre strands are interwoven with third fibre strands and the second fibre strands are interwoven with fourth fibre strands, for example, fifth fibre strands further being interwoven with the third fibre strands and forming a first closed passage together with the first fibre strands or sixth fibre strands being interwoven with the fourth fibre strands and forming a second closed passage together with the second fibre strands, the coupling element extending through the first and second passages.

9. A reinforcement member for connecting structures to intersection regions of said member for an aircraft or spacecraft, comprising an embedding part and comprising a component according to claim 1 which is embedded into the embedding part.

10. Structural arrangement, for an aircraft or spacecraft, comprising a first structure,
   comprising a second structure which forms an intersection region together with the first structure, and
   comprising the component according to claim 1 which interconnects the first and second structures in the intersection region.

11. The structural arrangement according to claim 10, wherein the first structure is formed as a box structure of an aerofoil or control surface or a control flap, the first fibre portion of the first fibre of the component being connected to a first wall portion of the box structure or the second fibre portion of the second fibre being connected to a second wall portion of the box structure, the second structure being configured as an internal web inside and an external web outside the box structure, the first fibre portion of the second fibre of the component being connected to the internal web or the second fibre portion of the first fibre of the component being connected to the external web, the external web comprising an eye for attaching an adjusting member selected from the group consisting of a flap carriage, a lever or a coupling rod.

12. The structural arrangement according to claim 11, wherein an adjusting member arranged on an aerofoil or control surface engages in the eye of the external web, the adjusting member being configured as a flap carriage which is displaceably arranged on the aerofoil or control surface and is in engagement with the eye.

13. An aircraft or spacecraft having a structural arrangement according to claim 10.

14. A method for producing a component according to claim 1, having the following steps:
   placing a first fibre around a first coupling element in such a way that the first fibre extends, with a first fibre portion, in a first plane in front of the coupling element together and, with a second fibre portion, in a second plane behind the coupling element, the first and second planes intersecting,
   placing a second fibre around a second coupling element in such a way that the second fibre extends, with a first fibre portion, in a third plane in front of the coupling element and, with a second fibre portion, in a fourth plane behind the coupling element, the third and fourth planes intersecting,
   removing the first and second coupling elements,
   superposing the first fibre with the second fibre in such a way that the first fibre portions of the first and second fibres intersect in a first region and the second fibre portions intersect in a second region and therefore form a closed passage for a third coupling element,
   inserting the third coupling element through the closed passage. fibre portions of the first and second fibres intersect in a first region and the second fibre portions intersect in a second region and therefore form a closed passage for a third coupling element,
   inserting the third coupling element through the closed passage.

15. Method according to claim 14, wherein a first woven fabric having a multitude of first fibres and a second woven fabric having a multitude of second fibres are provided, the first coupling element being pushed into a compartment instead of the weft thread when weaving the first woven fabric and the second coupling element being pushed into a compartment when weaving the second woven fabric.

* * * * *